United States Patent [19]

Takase et al.

[11] Patent Number: 5,539,172
[45] Date of Patent: Jul. 23, 1996

[54] APPARATUS AND METHOD FOR MACHINING A GEAR SHAPE

[75] Inventors: Kohyuh Takase; Norio Itoh, both of Toyota, Japan

[73] Assignee: Toyota Jidosha Kabushiki Kaisha, Aichi, Japan

[21] Appl. No.: 183,366

[22] Filed: Jan. 19, 1994

[30] Foreign Application Priority Data

| Jan. 22, 1993 | [JP] | Japan | 5-009554 |
| May 17, 1993 | [JP] | Japan | 5-115036 |
| Jun. 25, 1993 | [JP] | Japan | 5-155838 |
| Jul. 5, 1993 | [JP] | Japan | 15-165610 |

[51] Int. Cl.⁶ .............. B23H 9/00; B24B 5/00; G01M 13/02
[52] U.S. Cl. ............ 219/69.2; 73/162; 219/69.17; 451/219
[58] Field of Search .............. 219/69.17, 69.2, 219/69.16; 451/147, 47, 218, 219, 253, 547, 134, 173, 209, 210; 73/162; 33/501.13, 501.19, 501.16

[56] References Cited

U.S. PATENT DOCUMENTS

| 1,909,088 | 5/1933 | Bauer. | |
| 2,257,195 | 9/1941 | Rovick. | |
| 2,447,445 | 8/1948 | Widen et al. | 33/501.19 |
| 2,504,578 | 4/1950 | Pelphrey | 409/33 |
| 3,085,369 | 4/1963 | Findley | 451/47 |
| 3,180,032 | 4/1965 | Zuber | 33/501.19 |
| 3,611,800 | 10/1971 | Howlett et al. | |
| 3,712,000 | 1/1973 | Spear | 451/47 |
| 4,328,647 | 5/1982 | Gillette et al. | |
| 4,336,711 | 6/1982 | Maehara et al. | 73/162 |
| 4,585,377 | 4/1986 | Nozawa et al. | 451/219 |
| 4,587,766 | 5/1986 | Miyatake et al. | 451/219 |
| 4,617,762 | 10/1986 | Hoglund. | |
| 4,631,870 | 12/1986 | Sun | 451/219 |
| 4,704,799 | 11/1987 | Kobetsky. | |
| 4,772,368 | 9/1988 | Rabian | 219/69.2 |
| 5,260,879 | 11/1993 | Sasaki et al. | 409/2 |
| 5,413,520 | 5/1995 | Feisel | 451/147 |

FOREIGN PATENT DOCUMENTS

| 2558754 | 8/1985 | France. |
| 4016441 | 11/1991 | Germany. |
| 4317306 | 10/1993 | Germany. |
| 55-101325 | 8/1980 | Japan. |
| 57-108732 | 7/1982 | Japan. |
| 61-5528 | 1/1986 | Japan. |
| 61-178113 | 8/1986 | Japan. |
| 62-39198 | 2/1987 | Japan. |
| 4-152025 | 5/1992 | Japan. |
| 2146457 | 4/1985 | United Kingdom. |

OTHER PUBLICATIONS

Patent Abstracts of Japan, vol. 11, No. 35 (P–542), Feb. 3, 1987, JP–61 205 816, Sep. 12, 1986.
Patent Anstracts of Japan, vol. 11, No. 48 (M–561), Feb. 13, 1987, JP–61 209 818, Sep. 18, 1986.
Patent Abstracts of Japan, vol. 15, No. 391 (P–1259), Oct. 1, 1991, JP–03 156 339.
Patent Abstracts of Japan, vol. 17, No. 181 (M–1394), Apr. 8, 1993, JP–04 336 915, Nov. 25, 1992.
Patent Absracts of Japan, vol. 15, No. 184 (P–1200), JP–03 041 334, Feb. 21, 1991.

*Primary Examiner*—Geoffrey S. Evans
*Attorney, Agent, or Firm*—Oblon, Spivak, McClelland, Maier & Neustadt

[57] ABSTRACT

An apparatus and a method for machining a gear shape whereby when a gear is machined with a form tool, sludge is easily excluded and an accurate gear shape is provided. A method for machining an accurate gear shape whereby with a workpiece chucked, postprocess steps such as grinding and lapping are performed for consistent machining from material to completion of the gear shape, thereby removing a handling error caused by re-chucking the workpiece. A form tool supplied to a holder that can be rotated and slid in the Z direction by an automatic tool changer and a workpiece held by a chuck mounted on a side table that can be driven in the X and Y directions are synchronously rotated at a mesh assumed position under the control of a control section. Cut amount control is applied between both axes of the workpiece and the form tool and the workpiece is machined with the form tool. Form tools are supplied one after another by the automatic tool changer. With the workpiece chucked, mesh synchronous move of the form tool and the workpiece is performed and postprocess steps of machining are performed.

59 Claims, 32 Drawing Sheets

APPARATUS AND METHOD FOR MACHINING A GEAR SHAPE

BACKGROUND OF THE INVENTION

1. Field of the Invention

The present invention relates to an apparatus and a method for machining a workpiece with a form tool to produce a finished product of a gear shape and measuring it.

2. Description of the Related Art

Gears are important components of a machine for transmitting motion by meshing their teeth together one after another. Particularly, since the gears have capabilities of rotary motion of a precise speed ratio and efficiently transmitting large power with an extremely small structure, they are used in very wide number of fields, from the small gears of measuring instruments, watches, etc., to medium size gears of automobile transmission gears to the large gears used as reduction gears of a several ten thousand horse power marine turbine.

Generally, how little the gears cause vibration and noise to occur depends on how accurately they are machined, and improvement in the machining accuracy have been demanded. Particularly recently, improvement in the machining accuracy of gears to exclude vibration and noise sources is required in the automobile field in which the users attach importance to dwelling ability.

Hitherto, processes such as a machining process with a gear cutter, a forging process, and an electric discharge machining process have been used to form gears; for reasons of productivity, an extruding forging process and a sinter forging process are adopted whereby high-volume production of gears can be performed comparatively easily at low costs. For forging, the accuracy of forming dies directly affects gear accuracy, thus it is important to obtain accurate forging. The forging dies are machined by electric discharge machining which is applied independently of the mechanical strength of forging die material and is capable of accurate machining. An attempt has been made to improve the machining accuracy by various methods. For example, disclosed in Japanese Utility Model Laid-Open No. Sho 61-5528 is an electric discharge machining electrode with a roughing electrode and a finishing electrode located on one common electrode shaft whereby the finished machining accuracy of a gear shape can be improved. Described in Japanese Patent Laid-Open No. Hei 4-152025 is an electric discharge machining process of forging dies that can follow various specification changes of gears by forming the electric discharge machining electrode like a spur gear and changing the thickness of an electrode section formed on the gear tip.

In the conventional electric discharge machining of a gear shape, a workpiece is electric-discharge-machined to form the gear shape while a form electrode for electric discharge machining having the same shape as the gear shape to be formed is moved in the axial direction of the workpiece, namely, the gear shape to be formed. At this time, if the electric discharge machining electrode has a male gear shape, a female gear is formed; if the electrode has a female gear shape, a male gear is formed.

However, in the conventional electric discharge machining process of a gear shape, the form electrode for electric discharge machining moves in the axial direction of the gear for machining while the electrode and the workpiece approach each other at spacing of 0.02–0.05 mm via a processing liquid (insulating liquid such as kerosene or pure water), thus it is diffficult to exclude sludge; the sludge adheres to the work face or the electric discharge machining electrode and lowers insulation of the processing liquid, lowering machining accuracy by an external source. Just after electric discharge machining starts or just before it terminates, namely, when only a part of the electric discharge machining electrode approaches the workpiece, discharge concentrates on a part of the approach region of the workpiece and the electric discharge machining electrode; the discharge condition just after the electric discharge machining starts or Just before it terminates differs from that at the time of stationary machining time, namely, when the entire electric discharge machining electrode and the workpiece approach each ether uniformly. As a result, discharge concentrates around the entrance and exit of the electric discharge machining electrode because the area of the electric discharge machining electrode approaching the workpiece is small, and the workpiece is melted too much, causing the work face to change, resulting in lowering the accuracy of the gear shape.

Further, postprocess steps such as grinding, lapping, and shape measurement are generally required; the workpiece is again chucked at each step and a handling error occurs in addition to a mechanical work error, further lowering the accuracy of the gear shape.

SUMMARY OF THE INVENTION

Accordingly, it is a first object of the present invention to provide an apparatus and a method for machining a gear shape whereby a workpiece and a form tool, such as a form electrode, are synchronously moved at a mesh assumed position for machining the gear shape and easily excluding sludge, thereby improving the machining accuracy of the gear shape.

It is a second object of the present invention to provide an apparatus and a method for machining a gear shape whereby with a workpiece chucked, mesh synchronous move of the workpiece and various tools is performed for consistent machining from material to completion of the gear shape, thereby easily excluding sludge and removing a handling error, and thereby improving the machining accuracy of the gear shape.

It is a third object of the present invention to provide an apparatus and a method for machining a gear shape whereby with a workpiece chucked the gear shape can be measured as the final step of machining the gear shape.

In order to achieve the aforementioned objects, in accordance with the first aspect of the present invention, there is provided an apparatus for machining a gear shape comprising a chuck for pivotally supporting a workpiece, a mechanism for rotating the chuck, a mechanism for moving the chuck in any desired direction on a plane a holder for pivotally supporting a form tool of a gear shape used to machine the workpiece, a mechanism for rotating the holder, a mechanism for sliding the holder in the direction vertical to a chuck movement plane, and a control section which controls the chuck rotation mechanism, the chuck move mechanism, the holder rotation mechanism, and the holder sliding mechanism for causing the form tool to approach a mesh assumed position with the workpiece, rotating the workpiece and the form tool synchronously, and applying cut amount control between both axes of the workpiece and the form tool, thereby machining the workpiece with the form tool.

The form tool of a gear shape is made to approach the pivotally supported workpiece and they are rotated synchronously at a mesh assumed position. At the same time, while cut amount control is applied between both axes of the workpiece and the form tool, the workpiece is machined with the form tool. Therefore, the relative positional relationship between the workpiece and the form tool of a gear shape always changes and the approach part of both always becomes linear, enabling sludge to be easily excluded. Also, the approach distance between the workpiece and the form tool of the gear shape can always be made constant. As a result, the machining conditions always become constant independently of external sources, and an accurate gear shape can be provided.

In accordance with the second aspect of the present invention, there is provided an apparatus for measuring a gear shape comprising a chuck for pivotally supporting a workpiece, a mechanism for rotating the chuck, a mechanism for moving the chuck in any desired direction on a plane, a form master gear having a displacement section which carries out displacement in response to the shape of the workpiece, a holder for pivotally supporting the form master gear, a control section which controls the chuck rotation mechanism and the chuck movement mechanism for causing the workpiece and the form master gear to be meshed together and causing the form master gear to follow the rotation of the workpiece, and an error detection section which detects displacement of the displacement section of the form master gear for detecting a shape error of the workpiece.

The form master gear which can carry out displacement in response to a delicate shape change rotates following the workpiece which rotates. Therefore, the error detection section can efficiently detect displacement of the form master gear rotating following the workpiece for precisely detecting a shape error of the workpiece.

In accordance with the third aspect of the present invention, there is provided an apparatus for measuring a gear shape comprising a chuck for pivotally supporting a workpiece, a mechanism for rotating the chuck, a mechanism for moving the chuck in any desired direction on a plane, a form master gear having a displacement section which carries out displacement in response to the shape of the workpiece, a holder for pivotally supporting the form master gear, a mechanism for rotating the holder, a control section which controls the chuck rotation mechanism, the chuck move mechanism, and the holder rotation mechanism for causing the workpiece and the form master gear to be meshed together on an ideal mesh path and to be separately rotated for relative motion of the form master gear and the workpiece, and an error detection section which detects displacement of the form master gear and the workpiece with respect to the ideal mesh path for measuring a shape error of the workpiece and the form master gear.

The form master gear and the workpiece are rotated separately and are meshed together and moved on the ideal mesh path. As a result, push pressure in the circumferential direction applied between the form master gear and the workpiece can be excluded. Therefore, delicate displacement of the form master gear caused by a change in the workpiece shape can be precisely detected by the detection section for measuring the gear shape more stably.

In accordance with the fourth aspect of the present invention, there is provided an apparatus for machining a gear shape comprising a chuck for pivotally supporting a workpiece, a mechanism for rotating the chuck, a mechanism for moving the chuck in any desired direction on a plane, a holder for holding a form tool, the holder being disposed movably to any desired position and able to be rotated, a mechanism for rotating the holder, a first eccentric ring, with the axle center of the internal circumference of the ring being eccentric to that of the external circumference of the ring, for holding the holder on the internal circumference, at least one contour eccentric ring disposed for holding the first eccentric ring on the internal circumference of the contour eccentric ring, a mechanism for sliding the holder in the direction vertical to a chuck movement plane, and a control section which controls the chuck rotation mechanism. The chuck movement mechanism, the holder rotation mechanism, and the holder sliding mechanism, and controls rotation amounts of the first eccentric ring and the contour eccentric ring for causing the form tool to approach a mesh assumed position with the workpiece, rotating the workpiece and the form tool synchronously, and applying cut amount control between both axes of the workpiece and the form tool, thereby machining the workpiece with the form tool.

The holder holding the form tool is disposed slidably in any desired direction with respect to the machine center of the machining apparatus, and is held on the internal circumference of the first eccentric ring with the axle center of the internal circumference being eccentric to that of the external circumference. Further, the first eccentric ring is held on the internal circumference of the contour eccentric ring having the eccentric internal circumference. The first eccentric ring and the contour eccentric ring are eccentrically rotated separately by the control section, thereby moving the holder held by the first eccentric ring along any desired movement path.

Therefore, the holder fixing the form tool can be moved with any desired eccentric amount and at any desired speed by eccentric rotary motion of the first eccentric ring, and relative motion of the workpiece and the form tool can be executed smoothly. As a result, the workpiece can be machined smoothly to provide a smooth machined shape of the workpiece.

In accordance with the fifth aspect of the present invention, there is provided an apparatus for measuring a gear shape comprising a chuck for pivotally supporting a workpiece, a mechanism for rotating the chuck, a mechanism for moving the chuck in any desired direction on a plane, a form master gear having a displacement section which carries out displacement in response to the shape of the workpiece, a rotatable holder for holding the form master gear and being disposed movably to any desired position, a first eccentric ring, with the axle center of the internal circumference of the ring being eccentric to that of the external circumference of the ring, for holding the holder on the internal circumference, at least one contour eccentric ring disposed for holding the first eccentric ring on the internal circumference of the contour eccentric ring, a control section which controls the chuck rotation mechanism and the chuck movement mechanism and controls rotation amounts of the first eccentric ring and the contour eccentric ring for causing the workpiece and the form master gear to be meshed together and causing the form master gear to follow the rotation of the workpiece, and an error detection section which detects displacement of the displacement section of the form master gear for detecting a shape error of the workpiece.

Therefore, the holder holding the form master gear can be moved with any desired eccentric amount and at any desired speed by eccentric rotary motion of the eccentric ring, and relative motion of the workpiece and the form master gear can be executed smoothly. The displacement section of the form master gear can respond precisely to a delicate shape change of the workpiece for measuring the gear shape more precisely.

In accordance with the sixth aspect of the present invention, there is provided an apparatus for measuring a gear shape comprising a chuck for pivotally supporting a workpiece, a mechanism for rotating the chuck, a mechanism for moving the chuck in any desired direction on a plane, a form master gear having a displacement section which carries out displacement in response to the shape of the workpiece, a rotatable holder for holding the form master gear and being disposed movably to any desired position, a mechanism for rotating the holder, a first eccentric ring, with the axle center of the internal circumference of the ring being eccentric to that of the external circumference of the ring, for holding the holder on the internal circumference, at least one contour eccentric ring disposed for holding the first eccentric ring on the internal circumference of the contour eccentric ring, a control section which controls the chuck rotation mechanism. The chuck movement mechanism, and the holder rotation mechanism and controls rotation amounts of the first eccentric ring and the contour eccentric ring for causing the workpiece and the form master gear to be meshed together on an ideal mesh path and to be separately rotated for relative motion of the form master gear and the workpiece, and an error detection section which detects displacement of the form master gear and the workpiece with respect to the ideal mesh path for measuring a shape error of the workpiece and the form master gear.

The holder holding the form master gear can be moved with any desired eccentric amount and at any desired speed by eccentric rotary motion of the eccentric ring, and external force unnecessary for measurement, applied to the form master gear can be excluded. Therefore, relative motion of the workpiece and the form master gear can be executed more smoothly. The displacement section of the form master gear can respond precisely to a delicate shape change of the workpiece for measuring the gear shape more precisely.

In accordance with the seventh aspect of the present invention, there is provided an apparatus for machining a gear shape comprising a chuck for pivotally supporting a workpiece, a mechanism for moving the chuck in any desired direction on a plane, a unit for lapping the workpiece, a holder for pivotally supporting the lapping unit, a mechanism for sliding the holder in the direction vertical to a chuck movement plane, and a control section which controls the chuck movement mechanism and the holder sliding mechanism for moving the lapping unit up and down against the workpiece, thereby lapping the workpiece. The lapping unit has a supporter substantially like a pillar and a lapping tool attached to the axle center of the supporter in such a way that the lapping tool can be opened and closed. The lapping tool has a projection having a lapping grindstone.

For a gear formed with multiple gears like steps, if the gear is an external gear, the lapping tool is opened and the lapping unit is located at a predetermined position in the axial direction, then lapping is performed while the lapping tool is gradually closed. The lapping tool, which is provided with the projection, enables lapping the gear subjected to interference of another member when viewed from the installation position of the lapping unit. Therefore, accurate lapping can be performed up to the stepped part. The lapping unit is moved to the position of the gear being machined with the lapping tool opened, and thus can be easily moved to the machining position.

For internal gears, the lapping tool enables lapping the gear subjected to interference of another member when viewed from the installation position of the lapping unit; accurate lapping can be performed up to the stepped part. The lapping unit can be easily moved to the machining position.

In accordance with the eighth aspect of the present invention, there is provided a method of machining a gear shape comprising the steps of causing a form tool of a gear shape to approach a workpiece pivotally supported by a chuck, rotating the workpiece and the form tool synchronously at a mesh assumed position, applying cut amount control between both axes of the workpiece and the form tool, and machining the workpiece with the form tool to provide a desired gear shape.

The form tool of gear shape is made to approach the workpiece pivotally supported and they are rotated synchronously at the mesh assumed position. At the same time, while cut amount control is applied between both axes of the workpiece and the form tool, the workpiece is machined with the form tool. Therefore, the relative positional relationship between the workpiece and the form tool of gear shape always changes and the approach part of both always becomes linear, enabling sludge to be easily excluded. Also. the approach distance between the workpiece and the form tool of gear shape can always be made constant. Therefore, the machining conditions always become constant independently of external sources, and accurate gear shape can be performed.

In accordance with the ninth aspect of the present invention, there is provided a method comprising the steps of, with a workpiece chucked, while changing form tools in sequence, electric discharge machining, rotating the workpiece and form tool synchronously at a mesh assumed position, grinding and lapping the workpiece, and measuring the workpiece shape with a measuring tool.

When grinding and lapping are performed, the contact parts of the workpiece and tools also become linear and sludge can be easily excluded for stable machining. With the workpiece chucked, electric discharge machining can be followed by grinding, lapping, and measuring of the gear shape; a sequence of the machining steps of the gear shape can be performed with a handling error removed.

In accordance with the tenth aspect of the present invention, there is provided a method of machining a gear shape comprising the steps of causing a form tool and a workpiece held by a chuck to approach each other, rotating the workpiece and the form tool synchronously at a mesh assumed position, applying cut amount control between both axes of the workpiece and the form tool, and machining the workpiece with the form tool to provide a desired gear shape, wherein a holder for holding the form tool and being movable to any desired position is held on the internal circumference of a first eccentric ring with the axle center of the internal circumference being eccentric to that of the external circumference and rotation amounts of the first eccentric ring and of at least one contour eccentric ring for holding the first eccentric ring on the internal circumference of the contour eccentric ring are separately controlled, thereby moving the holder along any desired move path and determining the machined shape of the workpiece by the shape of the form tool and the move path of the holder.

The rotation amounts of the first eccentric ring and the contour eccentric ring are controlled separately, thereby enabling the holder held by the first eccentric ring to be moved along any desired move path; various workpiece shapes can be easily machined by any desired relative motion of the form tool and the workpierce. Therefore, relative motion of the workpiece and the form tool can be executed smoothly, and the machined face of the workpiece can be made smooth to provide an accurate machined shape of the workpiece.

In accordance with the eleventh aspect of the present invention, there is provided a method of measuring a gear shape wherein when a pivotally supported workpiece of gear shape and a pivotally supported form master gear for measuring the gear shape are meshed together and moved on an ideal mesh path, displacement of the form master gear and the workpiece with respect to the ideal mesh path is detected for measuring a shape error of the workpiece.

Since the form master gear and the workpiece are meshed together and moved on the ideal mesh path, push pressure in the circumferential direction applied between the form master gear and the workpiece can be excluded. Therefore, delicate displacement of the form master gear caused by a change in the workpiece shape can be precisely detected by the detection section for measuring the gear shape stably.

In accordance with the twelfth aspect of the present invention, there is provided a method of measuring a gear shape wherein when a pivotally supported workpiece of gear shape and a pivotally supported form master gear which is thin in the tooth trace direction for measuring the gear shape are meshed together and moved on an ideal mesh path and the form master gear is moved in the tooth trace direction of the workpiece, displacement of the form master gear and the workpiece with respect to the ideal mesh path is detected for measuring a shape error of the workpiece and the form master gear.

While the form master gear thin in the tooth trace direction and the workpiece are meshed together and moved on the ideal move path and the form master gear is moved in the tooth trace direction of the workpiece, displacement of the form master gear and the workpiece with respect to the ideal mesh path is detected by the detection section. Therefore, tooth trace accuracy as well as shape accuracy of the gear shape can be detected; an accurate gear shape can be provided.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Referring now to the accompanying drawings, there are shown preferred embodiments of the present invention.

Figure 1:
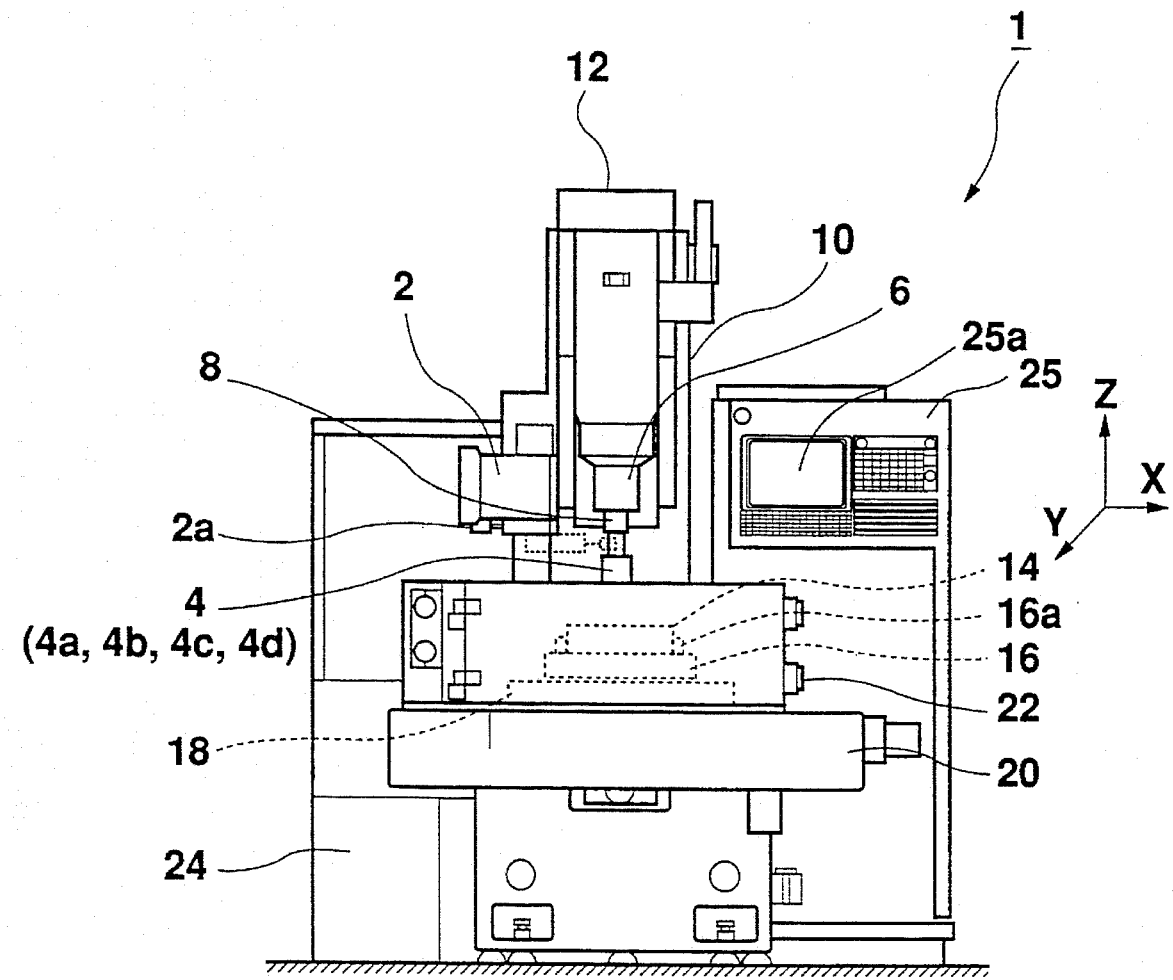
FIG. 1 is a schematic drawing of an apparatus for machining a gear shape according to the present invention.

FIG. 1 shows a schematic drawing of an apparatus for carrying out a method for machining a gear shape according to the invention.

Apparatus 1 is adapted to sequentially change a plurality of tools, suck as an electrode for electric discharge machining, a grinding wheel for grinding, a lapping grindstone for lapping, and a tool for measuring the shape of a workpiece, with the workpiece chucked for performing a sequence of machining steps, such as electric discharge machining, grinding, and lapping, from material to completion of a gear shape, and accuracy measurement. A tool 4 (an electrode 4a for electric discharge machining, a grinding wheel 4b for grinding, a lapping grindstone 4c for lapping, a measuring tool 4d for accuracy measurement, or the like; here the tools are substantially of the same form, and are shown on the same drawing) supplied by an automatic tool changer 2 having a robot arm 2a is held by a holder 8 interlocked with an index rotation unit 6 having an index positioning device. The holder 8 and the index rotation unit 6 are incorporated in a rotary head section 12 moving up and down along a column 10. A workpiece 14 to be machined is fixed by a chuck 16, which has a plurality of clicks 16a and can be rotated by a rotation mechanism (not shown) such as a servo motor. The chuck 16 is pivotally mounted on a base 18, which incorporates a chuck rotation mechanism. The base 18 is held by a saddle table, 20 having a drive mechanism that can be moved in the X an, Y axis directions. A processing tank 22, which surrounds the workpiece 14. The chuck 16, and the base 18 to secure the worker against danger during machining and temporarily stores a processing liquid injected or supplied to the workpiece 14, is provided on the top of the saddle table 20. The processing liquid conforming to machining is supplied to the processing tank 22 from a processing liquid supply unit 24, which also has capabilities of storing, depositing, filtering, etc., of the processing liquid. The apparatus 1 is provided with a controller 25 such as a centralized controller, etc., in addition to the components mentioned above.

Figure 2:
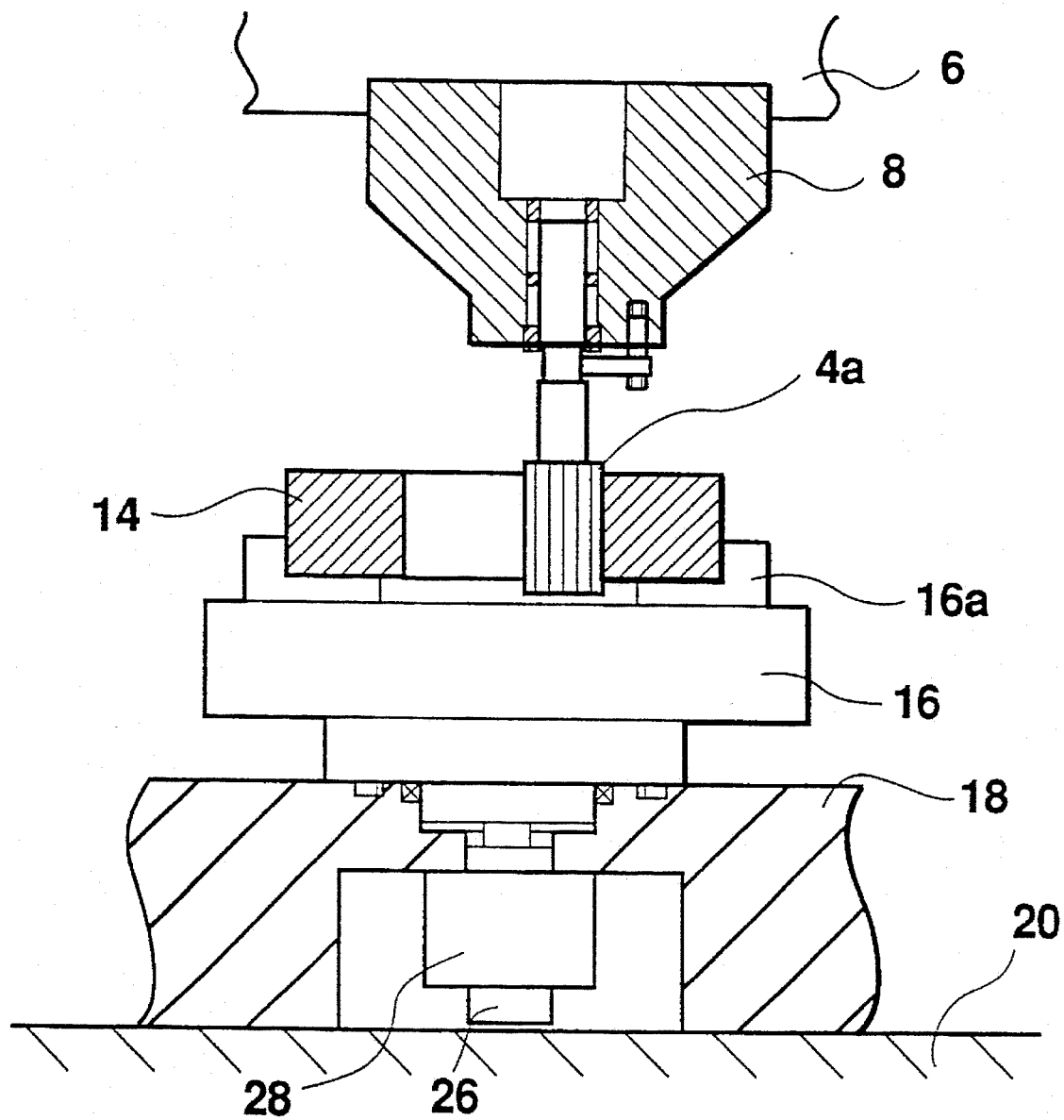
FIG. 2 is a partial sectional side view illustrating the position relationship between a workpiece and a form tool (form electrode) in the apparatus for machining a gear shape according to a first embodiment of the present invention.
Figure 3:
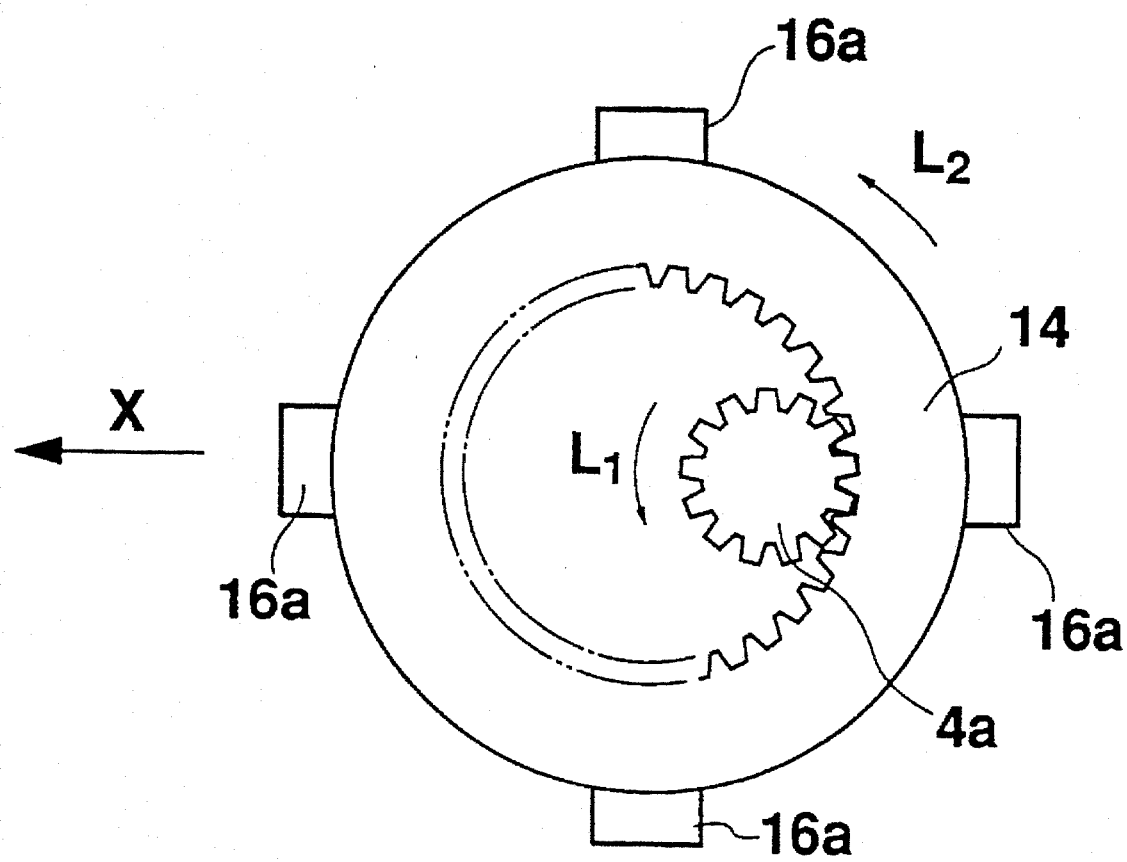
FIG. 3 is an illustration showing the positional relationship between a workpiece and a form tool (form electrode) in the apparatus for machining a gear shape according to the first embodiment of the present invention.

An electric discharge machining method of an internal gear shape is described is a first embodiment according to the apparatus 1 having the configuration with reference to FIGS. 2 and 3.

The invention is first characterized by the fact that the form electrode 4a of gear shape as the tool 4 is made to approach the workpiece 14 pivotally supported and that the workpiece 14 and the form electrode 4a are rotated while they are synchronized at mesh assumed positions and at the same time, that electric discharge machining is performed to provide a desired gear shape while cut amount control is applied between both axes of the workpiece 14 and the form electrode 4a.

The workpiece 14 and the form electrode 4a are rotated in synchronization with each other as a planet pinion gear and an internal gear of a planet gear mechanism are moved while they are meshing with each other. As shown in FIGS. 2 and 3, the form electrode 4a, which has a predetermined gear shape and is attached to the holder 8 at the machine center of the apparatus 1, rotates on its axis in the arrow $L_1$ direction in FIG. 3 while it performs electric discharge machining on the internal circumference of the workpiece 14 held by the clicks 16a of the chuck 16. At the time, the workpiece 14 is pivotally mounted on the base 18 and rotates in the arrow $L_2$ direction in FIG. 3 in synchronization with rotation of the form electrode 4a. At the time, the chuck 16 is rotated by a workpiece rotating servo motor 28 which has a chuck rotation position and speed detection section 26 and can perform feedback control for the rotation speed and position of the chuck 16. During electric discharge machining, like normal electric discharge machining, the processing tank 22 (see FIG. 1) is filled with a processing liquid, such as kerosene or pure water, and the workpiece 14 and the form electrode 4a are put into the processing liquid. Electric discharge machining conditions are determined and the workpiece 14 and the form electrode 4a are moved synchronously at mesh assumed positions. At this time, the saddle table 20 (see FIG. 1) on which the base 18 is installed is fed by a predetermined distance consecutively in sequence in the arrow X direction in FIG. 3, for example, to make an electric discharge machining allowance. Therefore, the mesh assumed positions of the workpiece 14 and the form electrode 4a become deep gradually deeper and the portions through which the form electrode 4a has passed are removed, thereby forming a gear shape on the internal circumference of the workpiece 14.

Figure 4:
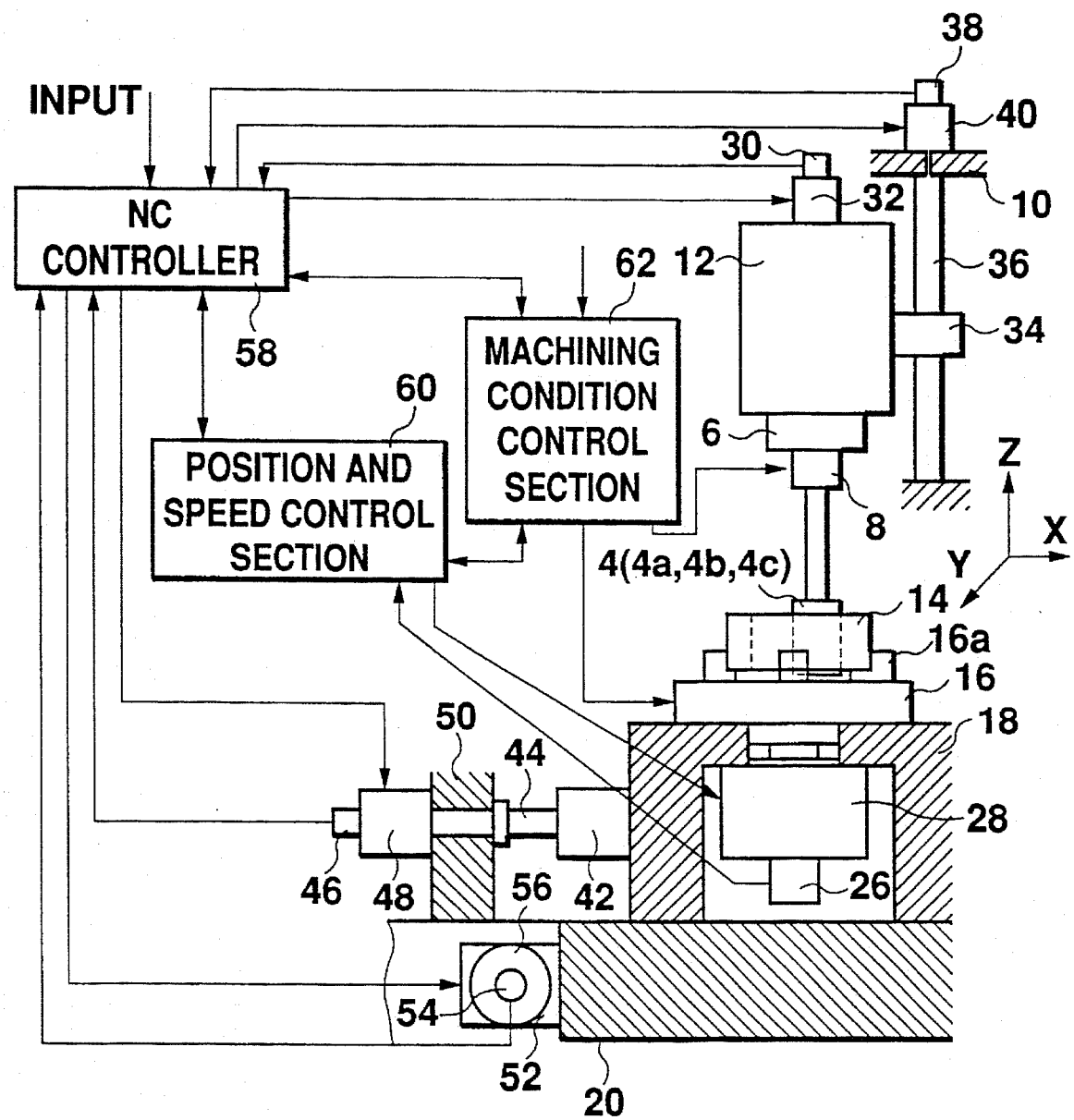
FIG. 4 is an illustration showing the configuration for carrying out mesh assumed synchronous movement in the apparatus for machining a gear shape according to the present invention.

FIG. 4 is a schematic drawing showing the configuration for rotating the workpiece 14 and the tool 4 while synchronizing them at mesh assumed positions in the apparatus for machining a gear shape according to the present invention. For example, for electric discharge machining, the form electrode 4a is attached to the holder 8 as the tool 4 and held by the rotary head section 12 containing the tool rotating servo motor 32 having the tool rotation position and speed detection section 30.

On the other hand, the workpiece 14 is held by the chuck 16 which is pivotally mounted on the base 18 and has a plurality of clicks 16a and is rotated in synchronization with rotation of the form electrode 4a by the workpiece rotating servo motor 28 which has the chuck rotation position and speed detection section 26 and can perform feedback control for the rotation speed and position of the chuck 16.

Further, the base 18 on which the chuck 16 is installed is driven in the left or right direction by an X direction feed mechanism. If the X direction feed mechanism consists of, for example, a ball screw 44, the base 18 fixed to a female screw section 42 is driven in the X direction (left or right direction in the figure) accurately by a base driving servo motor 48 which is engaged with a bed 50 and has a base rotation position and speed detection section 46. The saddle table 20 on which the base 18 is installed is driven back and forth by a Y direction feed mechanism. If the Y direction feed mechanism consists of, for example, a ball screw, the saddle table 20 fixed to a female screw section 52 is driven in the Y direction (back and forth in the figure) accurately by a saddle table driving servo motor 56 which has a saddle table rotation position and speed detection section 54. The direction and amount of motion of the workpiece 14 can be changed as desired by combining drive in the X direction and in the Y direction.

The servo motors 28, 32, 48, and 56 are controlled by an NC controller 58 so that the related servo motors perform predetermined operation in conjunction with each other. Particularly during electric discharge machining, the rotation speed of the tool rotating servo motor 32 for driving the form electrode 4a is kept accurate by the NC controller 58 and the rotation speed of the workpiece rotating servo motor 28 operating so as to follow the form electrode 4a is controlled by a position and speed control section 60 which always detects the rotation position and speed of the workpiece 14, feeds them back, and performs comparison operation for control; machining is performed by a machining condition control section 62 which controls machining conditions which moving with signals of the NC controller 58 and the position and speed control section 60. Since the workpiece 14 and the form electrode 4a perform mesh assumed synchronous move together while they are rotating mutually, the relative positional relationship between them always changes and the approach portion of the workpiece 14 and the form electrode 4a always becomes linear, enabling sludge to be discharged or removed easily and a processing liquid to circulate smoothly. Since mesh assumed synchronous move is performed, the approach amount of the workpiece and the form electrode of a gear shape can always be made constant and change of electric discharge machining conditions caused by an external source can be suppressed. Therefore, a gear shape can be electric-discharge-machined accurately.

For example, even an internal stepped gear shape whose bottom has a larger inner diameter than the top can be electric-discharge-machined easily by a similar machining method.

Further, in the embodiment, the rotary head section 12 is driven up and down by a Z direction feed mechanism to apply relative movement in the tooth trace direction between the workpiece 14 and the form electrode 4a to machine a stepped gear shape. If the Z direction feed mechanism consists of, for example, a ball screw 36, the rotary head section 12 fixed to a female screw section 34 is driven in the Z direction (upward and downward in the figure) smoothly by a head section driving servo motor 40 which is engaged with the column 10 and has a head section rotation position and speed detection section 38.

Figure 5:
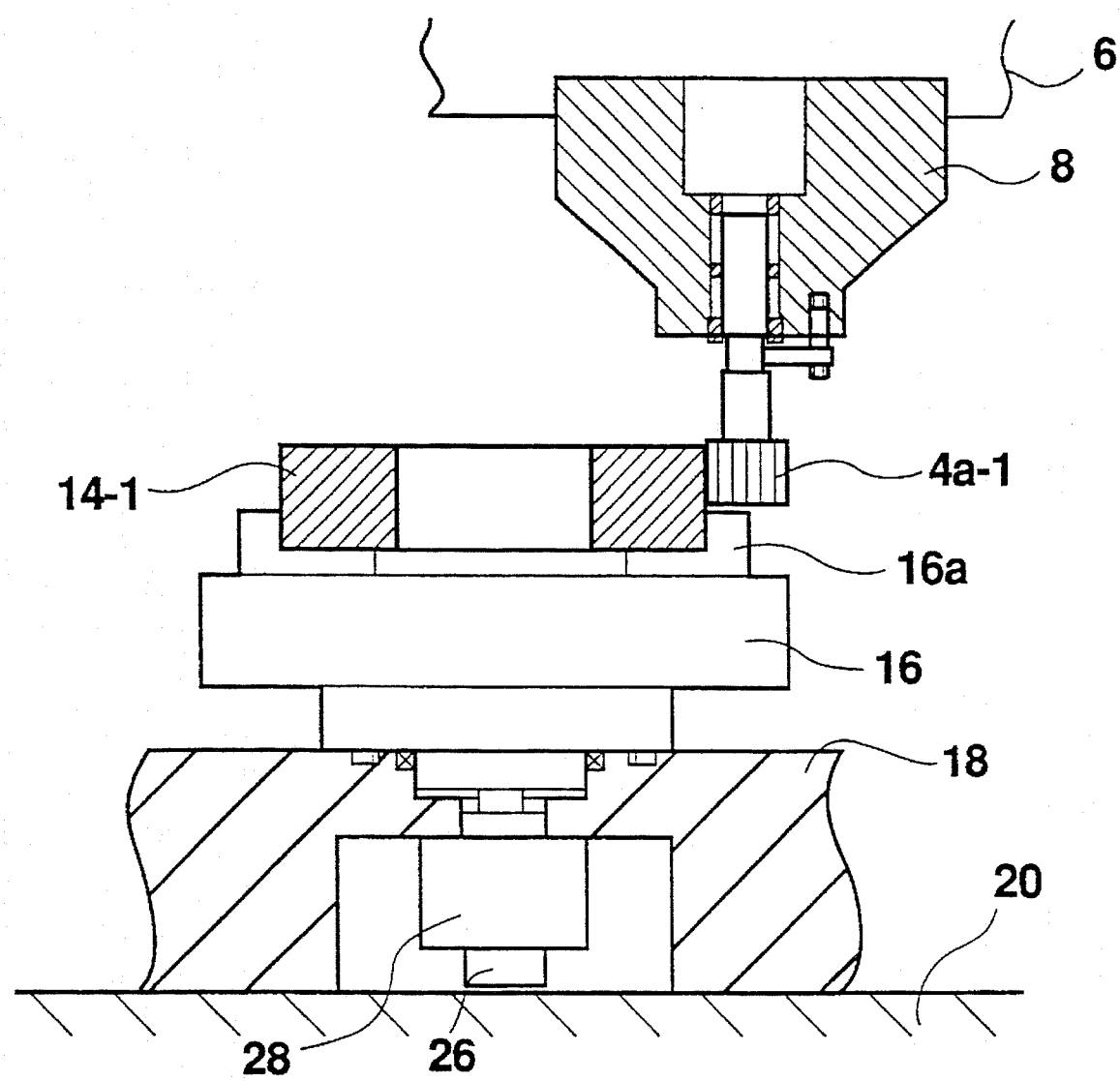
FIG. 5 is a partial sectional side view illustrating the position relationship between a workpiece and a form tool (form electrode) in the apparatus for machining a gear shape according to a second embodiment of the present invention.
Figure 6:
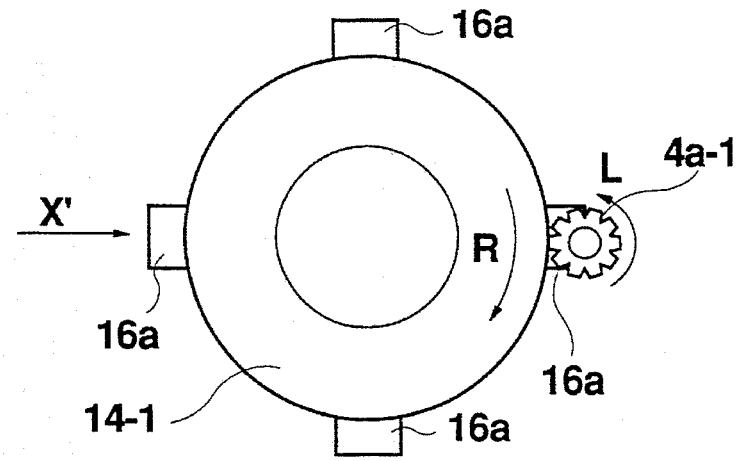
FIG. 6 is an illustration showing the position relationship between a workpiece and a form tool (form electrode) in the apparatus for machining a gear shape according to the second embodiment of the present invention.

FIGS. 5 and 6 show a method for electric discharge machining an external gear shape as a second embodiment. The machining method of the external gear shape can be embodied by the same apparatus and control method as the electric discharge machining method of the internal gear shape according to the first embodiment except that a form electrode 4a-1 for electric discharge machining and a workpiece 14-1 perform mesh assumed synchronous movement while the form electrode 4a-1 is rotating on the external circumference of the workpiece 14-1 in the opposite direction to the workpiece 14-1 (the form electrode 4a-1 rotates in the L direction in FIG. 6 and the workpiece 14-1 rotates in the R direction in FIG. 6). In this case, by feeding the chuck 16 by a predetermined distance consecutively in sequence in the arrow X' direction in FIG. 6 as an electric discharge machining allowance, the mesh assumed positions of the workpiece 14-1 and the form electrode 4a-1 become gradually deeper and the portions through which the form electrode 4a-1 has passed are removed, thereby forming a gear shape on the external circumference of the workpiece 14-1.

Figure 7:
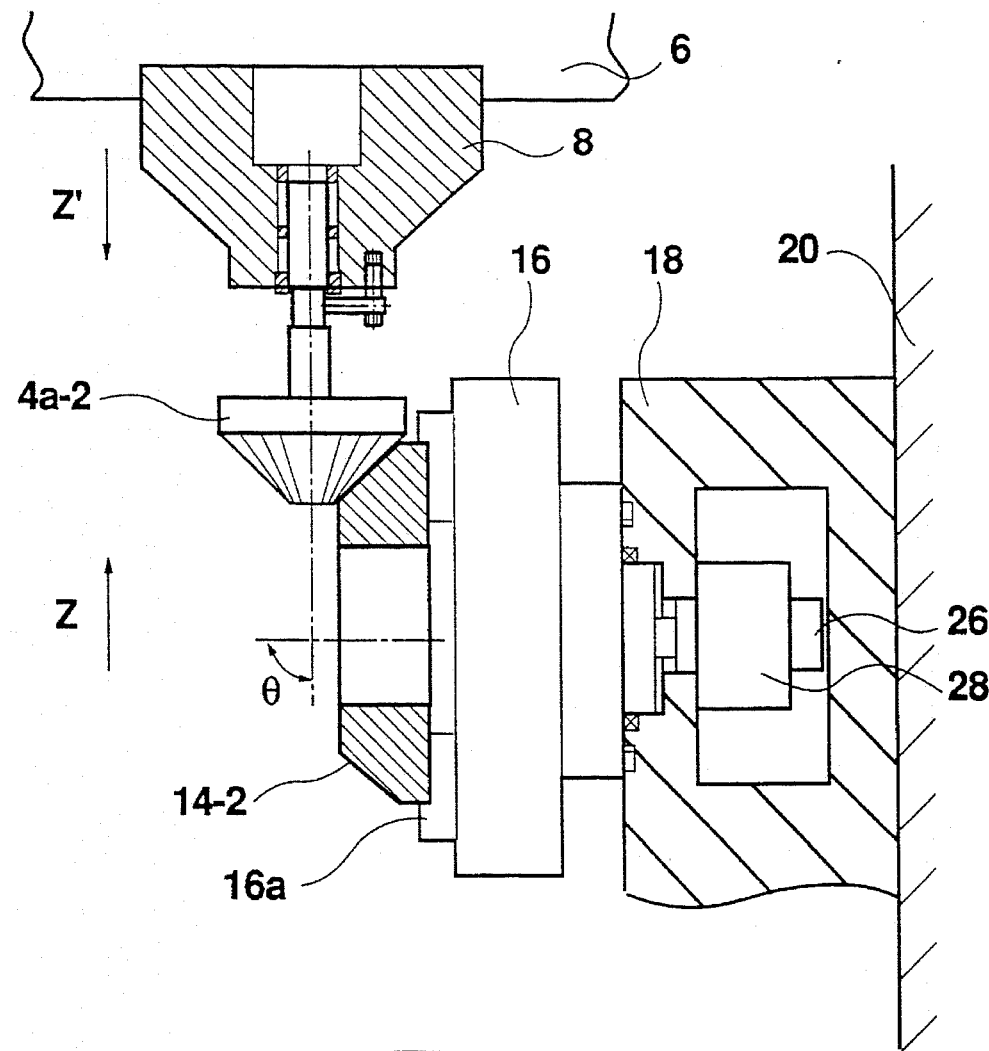
FIG. 7 is a partial sectional side view illustrating the positional relationship between a workpiece and a form tool (form electrode) in the apparatus for machining a gear shape according to a third embodiment of the present invention.
Figure 8:
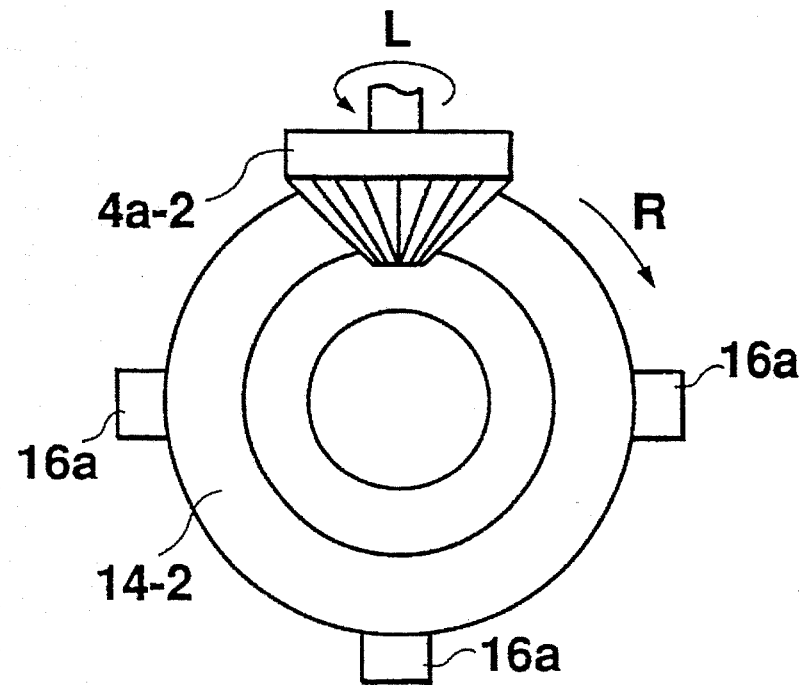
FIG. 8 is an illustration showing the positional relationship between a workpiece and a form tool (form electrode) in the apparatus for machining a gear shape according to the third embodiment of the present invention.

FIGS. 7 and 8 show a method for electric discharge machining a bevel gear shape as a third embodiment. The machining method of the bevel gear shape can be embodied by the same apparatus and control method as the electric discharge machining method of the external gear shape according to the second embodiment except that a workpiece 14-2 is located inclined by angle θ with respect to a form electrode 4a-2 in response to an axial angle θ of the bevel gear shape, as shown in FIGS. 7 and 8. This means that the rotation drive means of the workpiece 14 such as chuck 16, base 18, and saddle table 20 are disposed inclined by angle θ with respect to the rotation axis of the form electrode 4ag. In this case, the chuck 16 moves by a predetermined distance consecutively in sequence in the arrow Z direction in FIG. 7 as an electric discharge machining allowance, whereby the mesh assumed positions of the workpiece 14-2 and the form electrode 4a-2 become gradually deeper and the portions through which the form electrode 4a-2 has passed are removed, thereby forming a bevel gear shape on the external circumference of the workpiece 14-2. In this case, similar machining can also be performed by moving the form electrode 4a-2 by a predetermined distance consecutively in sequence in the arrow Z' direction in FIG. 7 by the tool rotating servo motor 32 having the 2, direction feed mechanism (see FIG. 4).

As described above, the position relationship between the form electrode and workpiece is changed in response to a desired gear shape by crossing the rotation axes of the form electrode and workpiece at any desired angle θ or offsetting the rotation axes or performing both, and mesh assumed synchronous move of the workpiece and the electrode formed to a desired gear shape is performed, thereby machining spur gears, helical gears, double helical gears, and bevel gears such as skew bevel gears, zerol bevel gears, and hypoid gears.

The invention is secondly characterized by the fact that, as keeping a workpiece fixed to the chuck, electric discharge machining, and the following grinding, lapping, and measuring of the worked shape of the workpiece (described below) are continuously performed with tools 4 (grinding wheel 4b for grinding, a lapping grindstone 4c for lapping, a measuring tool 4d for accuracy measurement) supplied by an automatic tool changer having a robot arm.

As with electric discharge machining, the form grinding wheel 4b of a gear shape or the lapping grindstone 4c is made to approach the workpiece, is then brought into contact with the workpiece, and mesh synchronous movement of the workpiece and grinding wheel or lapping grindstone is performed and cut amount control is applied between both axes of the workpiece and grinding wheel or lapping grindstone for grinding or lapping the workpiece to provide a desired gear shape. Therefore, the grinding wheel 4b or the lapping grindstone 4c revolves while rotating on its axis with respect to the workpiece for grinding or lapping the actual mesh parts with the workpiece, thereby providing a gear shape in the same contact state as they are meshed together. Although sufficient grinding and lapping can be performed by mesh synchronous movement, the grinding wheel, lapping grindstone, etc., are driven in the direction parallel to the rotation axis thereof, namely, the rotary head section holding the tool is driven up and down by the Z axis feed mechanism for relative reciprocating of the tool along the tooth trace of the gear shape being machined, thereby grinding and lapping the workpiece more efficiently and accurately. Furthermore efficient machining can be performed by applying the relative reciprocating motion by high-frequency vibration. Therefore accurate machining can be performed by applying the normal reciprocation motion and the reciprocating motion by high-frequency vibration. The high-frequency vibration is performed by the Z direction feed mechanism.

Figure 9:
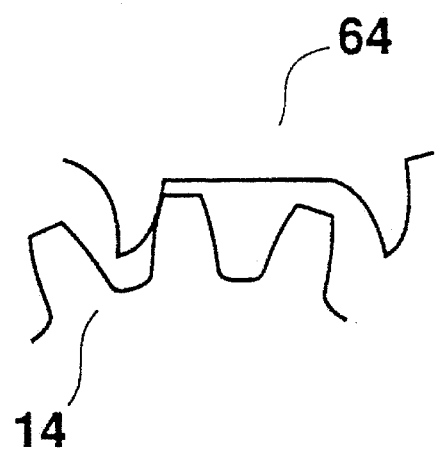
FIG. 9 is an illustration giving an example of the form of a grinding wheel or lapping grindstone used with the apparatus for machining a gear shape according to the present invention.
Figure 10:
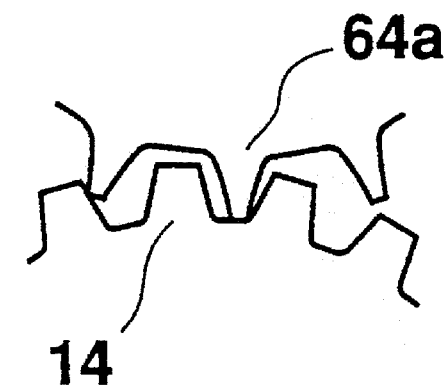
FIGS. 10(A), 10(B), and 10(C) are illustrations giving other examples of the form of a grinding wheel or lapping grindstone used with the apparatus for machining a gear shape according to the present invention.
Figure 10:
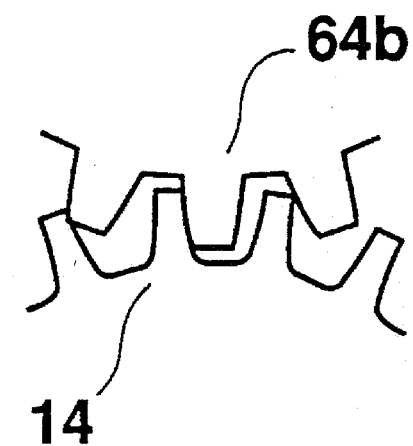
Figure 10:
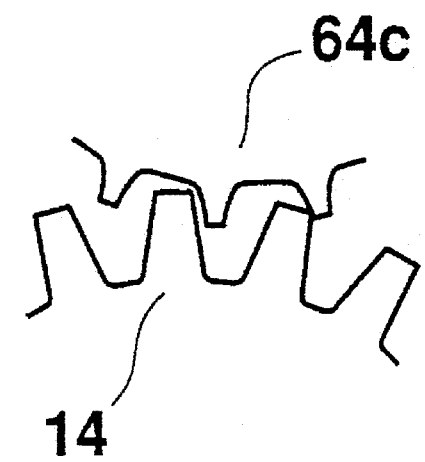

On the other hand, to grind or lap a complicated gear shape of a bevel gear, etc., it is necessary to avoid interference of a workpiece and grindstone other than machining positions. Machining with no interference of the workpiece 14 and grindstone 64 is enabled by forming a tooth of the grindstone 64, every two teeth of the workpiece 14, as shown in FIG. 9. The grindstone form is changed and the gear shape is partially machined, thereby machining a desired gear shape more accurately, as shown in FIGS. 10(A), 10(B), and 10(C). That is, grindstone 64a shown in FIG. 10(A), whose tooth thickness is decreased, is used to machine the tooth root part of the workpiece 14; grindstone 64b, 64c shown in FIGS. 10(B), 10(C), whose tooth length is lowered, is used to machine the tooth tip part of the workpiece 14. In addition, an accurate gear shape which is good in tooth touch can be manufactured by fitting the grindstone form, as required, to a form for machining only a gear face, for example.

Next, described as a fourth embodiment are an apparatus and method for machining a gear shape whereby a form tool can be moved along a smoother path of movement with respect to a workpiece for providing a smooth machined shape of the workpiece.

Figure 11:
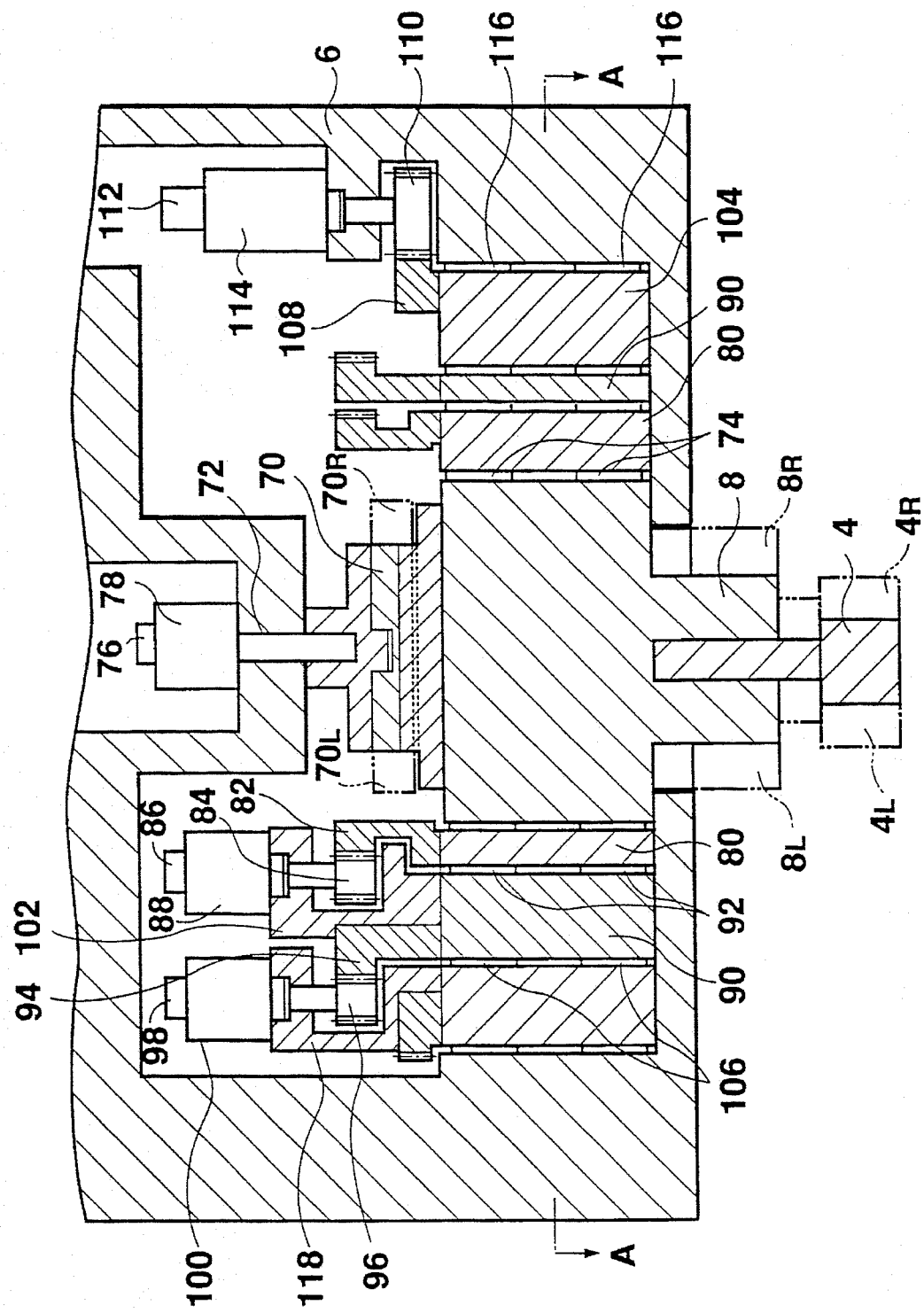
FIG. 11 is a sectional view showing an eccentric rotation mechanism in the apparatus for machining a gear shape according to a fourth embodiment of the present invention.

The overall configuration of the apparatus according to the fourth embodiment is similar to the configuration shown in FIG. 1 and is characterized by the fact that the index rotation unit 6 in the apparatus 1 has an eccentric rotation mechanism whose schematic sectional view is as shown in FIG. 11.

A form tool 4 having a predetermining gear shape is fixed to a holder 8, a rotation axis. The holder 8 can be slid in any desired direction with respect to the machine center of the apparatus 1 via an Oldham coupling 70 and a driving shaft 72 and is held by ring-like bearings 74 and pivotally held by a servo motor 78 having a rotation position and speed detection section 76. A plurality of eccentric rings (three in the embodiment) are disposed on the outside of the holder 8; the center axes of the internal and external circumferences of each eccentric ring are eccentric to each other. That is, inner eccentric ring 80, middle eccentric ring 90, and outer eccentric ring 104 are located on the outside of the holder 8. The inner eccentric ring 80 as a first eccentric ring is pivotally disposed via the bearings 74 on the outside of The holder 8. A driven gear 82 is fixed to the inner eccentric ring 80, which is accurately controlled and rotated via a driving gear 84 by a servo motor 88 having a rotation position and speed detection section 86. Further, the middle eccentric ring 90 as a contour eccentric ring is pivotally disposed via bearings 92 on the outside of the inner eccentric ring 80. A driven gear 94 is fixed to the middle eccentric ring 90, which is accurately controlled and rotated via a driving gear 96 by a servo motor 100 having a rotation position and speed detection section 98. The servo motor 88 for driving the inner eccentric ring 80 is fixed to an installation stand 102 fixed to the middle eccentric ring 90. Likewise, the outer eccentric ring 104 as a second contour eccentric ring is pivotally disposed via bearings 106 on the outside of the middle eccentric ring 90. A driven gear 108 is fixed to the outer eccentric ring 104, which is accurately controlled and rotated via a driving gear 110 by a servo motor 114 having a rotation position and speed detection section 112. The servo motor 114 is fixed on the wall of the index rotation unit 6 and the outer eccentric ring 104 is pivotally held by bearings 116 to the index rotation unit 6. The servo motor 100 for driving the middle eccentric ring 90 is fixed to an installation stand 118 fixed to the outer eccentric ring 104. Therefore, the holder 8 for holding the form tool 4, the inner eccentric ring 80, the middle eccentric ring 90, and the outer eccentric ring 104 are pivotally incorporated in the index rotation unit 6.

Figure 12:
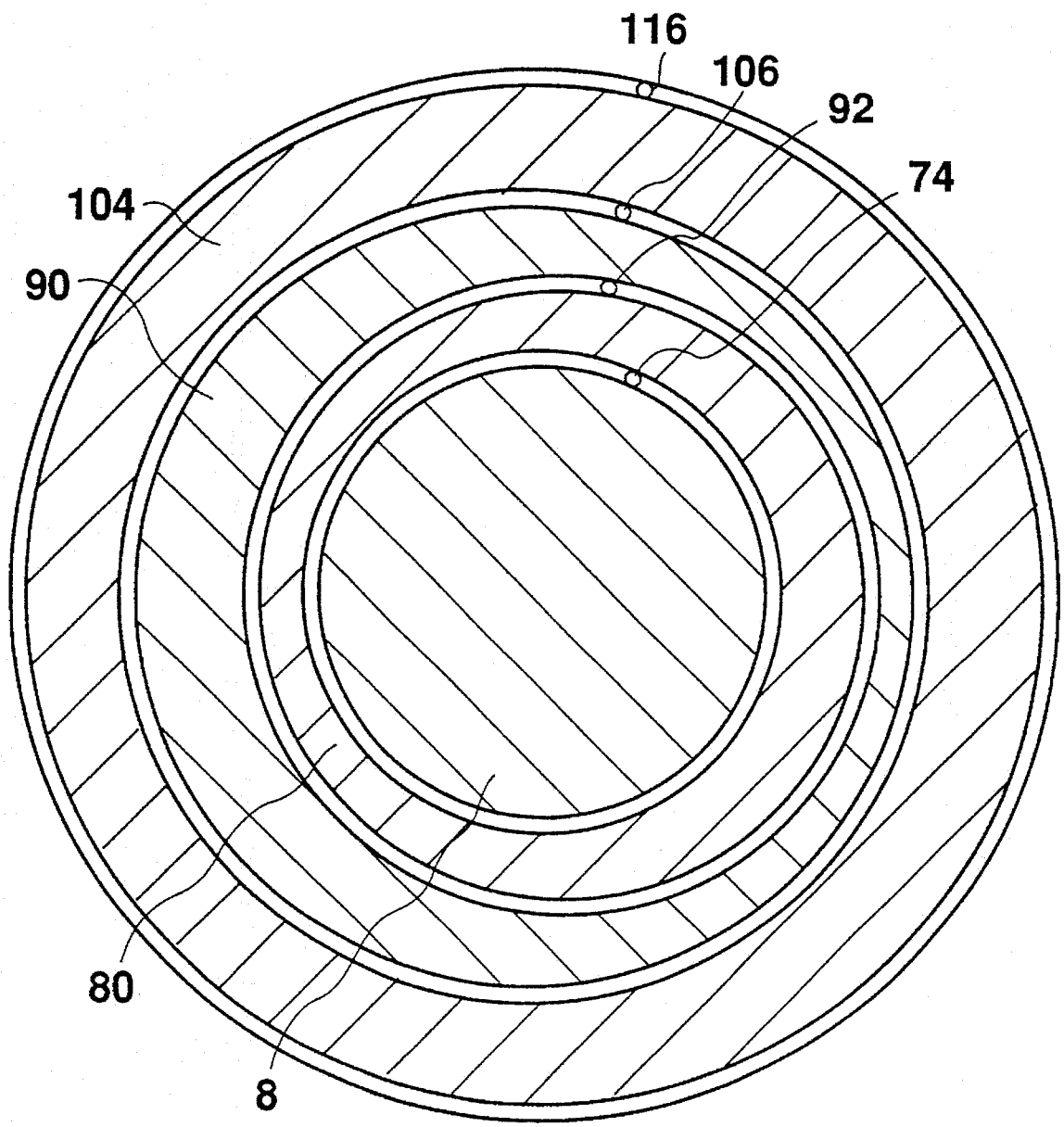
FIG. 12 is a partial sectional view of eccentric rings of the eccentric rotation mechanism in the apparatus for machining a gear shape according to the fourth embodiment of the present invention.

FIG. 12 shows the main part of a sectional view taken on line A—A in FIG. 11. The inner eccentric ring 80 or middle eccentric ring 90 which is rotated by any rotation amount by the servo motor 88 or 100 causes the holder 8 to become eccentric to the rotation shaft of the servo motor 78 fixed to the index rotation unit 6 in the machine center in the apparatus 1. Both the inner eccentric ring 80 and the middle eccentric ring 90 are rotated in any desired direction, thereby giving a necessary eccentric amount to the holder 8. Therefore, the eccentric amount, its direction, and the eccentric speed of the holder 8 can be accurately controlled by the servo motors 88 and 100 having the rotation position and speed detection sections 86 and 98. At this time, the Oldham coupling 70 is used as means for smoothly making the holder 8 eccentric and securely transmitting rotation of the servo motor 78 to the holder 8.

Thus, the form tool 4 held by the holder 8 rotates at any speed of revolution controlled by the servo motor 78 and is given any desired eccentric amount by the inner eccentric ring 80 and the middle eccentric ring 90. Further, the outer eccentric ring 104 rotates at any desired speed of revolution, thereby causing the holder 8, the inner eccentric ring 80, and the middle eccentric ring 90 to rotate with the outer eccentric ring as a unit. In FIG. 11, the form tool 4 eccentrically moves in the range of 4L to 4R, the holder 8 in the range of 8L to 8R, and the Oldham coupling 70 in the range of 70R to 70L.

Figure 13:
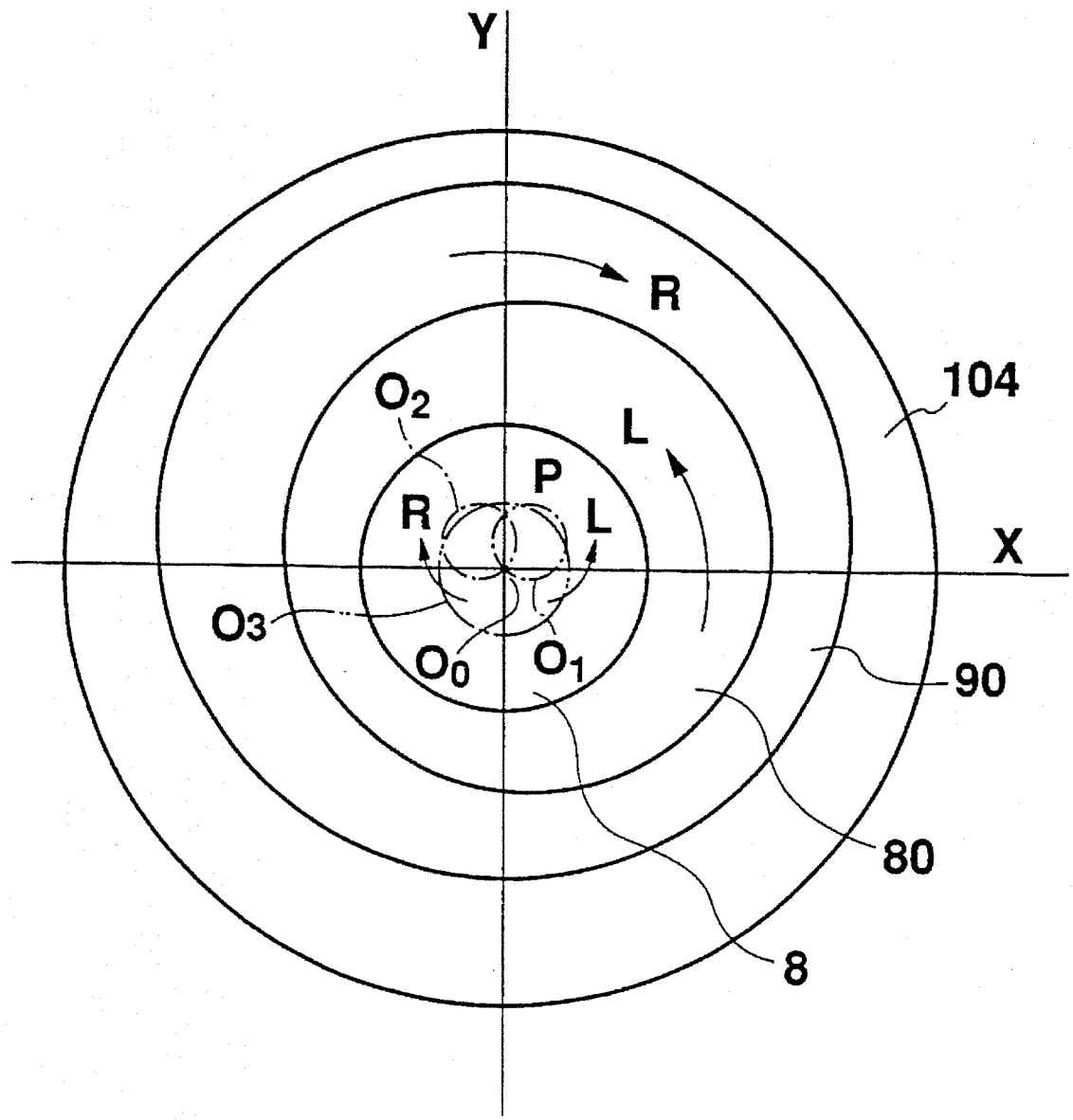
FIG. 13 is an illustration showing a movement path of the rotation center of a holder of the eccentric rotation mechanism in the apparatus for machining a gear shape according to the fourth embodiment of the present invention.

FIG. 13 shows a movement model of the eccentric rings 80, 90, and 104 and the holder 8. Point 0o shows the state in which the rotation center of the outer eccentric ring 104 (revolution center of the holder 8) matches the rotation center of the holder 8. If the inner eccentric ring 80 only is rotated in the L direction from this state, the rotation center $0_0$ of the holder 8, follows movement path $0_1$ indicated by a broken line. If the middle eccentric ring 90 only is rotated in the R direction, the rotation center $0_0$ of the holder 8, follows movement path $0_2$ indicated by a broken line. Arbitrary point; P on the movement path $O_1$ of the rotation center $0_0$ of the holder 8, when only the inner eccentric ring 80 is rotated, rotates with the rotation center of the outer eccentric ring 104 (revolution center of the holder 8), $0_0$, as the center, and the holder 8 moves on movement path $0_3$ indicated by an alternate long and two short dashes line. This means that the holder 8 revolves while rotating on its axis with the rotation center $0_0$ as the center. By rotating the inner eccentric ring 80 and the middle eccentric ring 90 in the opposite directions each other, movement components of the move paths $O_1$ and $0_2$ in the X direction are negate each other, thereby making the point P eccentric only in the Y-Y direction. Further, the eccentric path of the holder 8 can be approximately doubled by rotating the inner eccentric ring 80 and the middle eccentric ring 90 in the same direction. This means that if both are rotated in the L direction, the eccentric path with the rotation center $0_0$ as the starting point becomes about twice as long as the movement path $0_2$ and that if both are rotated in the R direction, the eccentric path can be made about twice as long as the move path $0_2$. Therefore, by controlling the servo motors 88, 100, and 114 shown in FIG. 11, various types of movement can be combined and the holder 8 can be controlled with any desired eccentric amount and in any desired eccentric direction.

Figure 14:
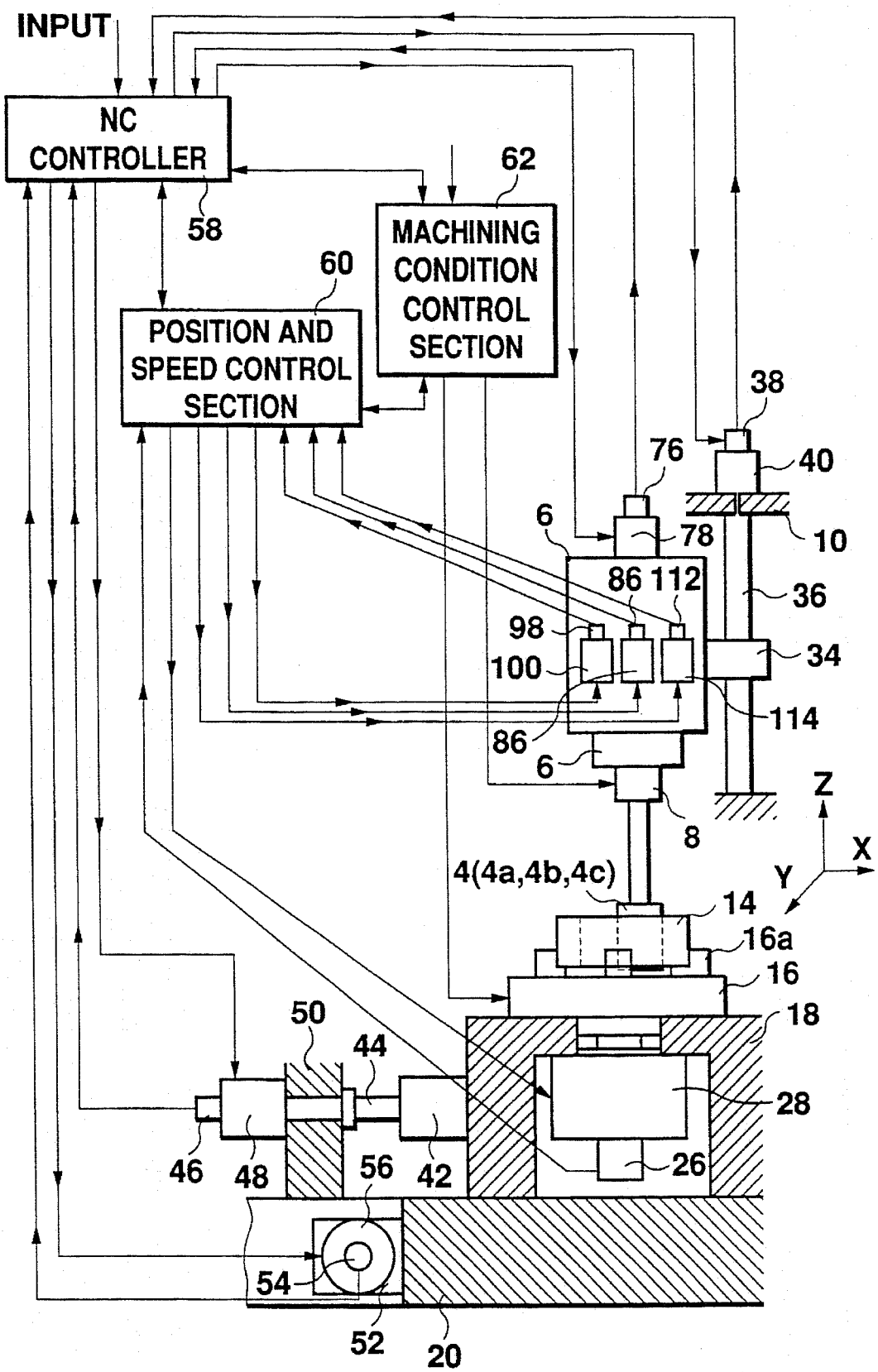
FIG. 14 is an illustration showing the configuration for carrying out eccentric synchronous movement in the machining apparatus of a gear shape according to the fourth embodiment of the present invention.

FIG. 14 is a schematic drawing showing an example of the configuration for carrying out eccentric synchronous move in the apparatus according to the embodiment. The form tool is attached to the holder 8 and is held with the index rotation unit 6 containing the servo motor 78 having the rotation position and speed detection section 76.

As described above, the eccentric rotation mechanism is incorporated in the index rotation unit 6 and the eccentric rings cause the holder 8 to be eccentrically rotated along any desired movement path by the servo motors 88, 100, and 114 having the rotation position and speed detection sections 86, 98, and 112.

On the other hand, a workpiece 14 is held by a chuck 16, which has a plurality of clicks 16a and is pivotally mounted on a base 18. The chuck 16 is rotated in synchronization with rotation of the form tool 4 by a servo motor 28 which has a rotation position and speed detection section 26 and can perform feedback control of the rotation speed and position of the chuck 16.

Further, the base 18 on which the chuck 16 is installed is driven in the left or right direction by an X direction feed mechanism. If the X direction feed mechanism consists of, for example, a ball screw 44, the base 18 fixed to a female screw section 42 moves in the X direction (left or right direction in the figure) accurately by a servo motor 48 which is engaged with a bed 50 and has a rotation position and speed detection section 46. The saddle table 20 on which the base 18 is installed is driven back and forth by a Y direction feed mechanism. If the Y direction feed mechanism consists of, for example, a ball screw, the saddle table 20 fixed to a female screw section 52 is moved in the Y direction (back and forth in the figure) accurately by a servo motor 56 which has a rotation position and speed detection section 54. The eccentric direction and amount of rotary motion of the workpiece 14 can be changed as desired by combining drive in the X direction and that in the Y direction.

The servo motors 78, 86, 100, 114, 28, 48, and 56 are controlled by an NC controller 58 so that the related servo motors perform predetermined operations in conjunction with each other. Particularly during electric discharge machining, the rotation speed and amount of the servo motor 78 for causing the form tool 4 to rotate on its axis and those of the servo motors 86, 100, and 114 for causing the form tool 4 to revolve are always detected and fed back for comparison operation and control by the NC controller 58 and a position and speed control section 60 to accurately maintain the rotation speed and amount. Likewise, the rotation speed and amount of the servo motors 28, 48, and 56 operating so that the form tool 4 follows the workpiece 14 are controlled by the position and speed control section 60 which always detects the rotation position, speed, and amount of the workpiece 14, feeds them back, and performs comparison operation for control. Machining is performed by a machining condition control section 62 which controls machining conditions while moving with signals of the NC controller 58 and the position and speed control section 60. Since the workpiece 14 and the form tool 4 perform eccentric synchronous movement together while they are rotating mutually, the relative position relationship between them always changes and the approach portion of the workpiece 14 and the form tool 4 always becomes linear, enabling sludge to be discharged or removed easily and a processing liquid to circulate smoothly. While the workpiece 14 and the form tool 4 are smoothly moved relatively, their approach amount can always be made constant and change of machining conditions caused by an external source can be suppressed. Therefore, a substantially ideal shape can be electric-discharge-machined accurately.

For example, even an internal stepped gear shape whose bottom has a larger inner diameter than the top can be electric-discharge-machined easily by the apparatus.

Further, relative movement in the tooth trace direction needs to be applied between the workpiece 14 and the form tool 4 to machine a stepped gear shape. Then, the apparatus is adapted to drive the index rotation unit 6 up and down by a Z direction feed mechanism. If the Z direction feed mechanism consists of, for example, a ball screw 36, the index rotation unit 6 fixed to a female screw section 34 is driven in the Z direction (upward and downward in the figure) smoothly by a servo motor 40 which is engaged with the column 10 and has a rotation position and speed detection section 38.

In the embodiment, machining the internal circumference of the workpiece with the form tool which revolves while rotating on its axis is taken as an example for description; the example also applies to machining the external circumference of the workpiece. That is, the NC controller 58, the position and speed control section 60, and the machining control section 62 can operate in conjunction with each other to drive the servo motors for machining the external circumference of the workpiece.

Thus, the apparatus having the eccentric rotation mechanism can machine spur gears, helical gears, double helical gears, rack & pinion, etc. The apparatus can also machine bevel gears such as skew bevel gears, zerol bevel gears, and hypoid gears by inclining the saddle table 20 containing the chuck 16 for fixing the workpiece 14 by desired angle θ with respect to the form tool 4.

Workpieces of different shapes can be machined with a form tool of a single shape, such as a form gear shape having predetermined gear dimensions, by changing the eccentric speed and amount of the form tool. Further, workpieces of different shapes can also be machined with cylindrical and square tools. Therefore, the number of types of tools to be prepared can be reduced and the machining time can be shortened for decreasing the machining costs.

According to the apparatus in the embodiment, with a workpiece fixed to the chuck, continuous machining can be performed, for example, electric discharge machining, and the following grinding, lapping, and accurate measuring of the machined workpiece (described below) are continuously performed with tools 4 (electrode 4a for electric discharge machining, grinding wheel 4b for grinding, a lapping grindstone 4c for lapping, a measuring tool 4d for accuracy measurement) supplied by an automatic tool changer having a robot arm.

For machining, each of the gear shaped tools is brought into contact with the workpiece, and eccentric synchronous movement of the workpiece and the tool is performed and cut amount control is applied between both axes of the workpiece and tool for electric discharge machining, grinding, or lapping of the workpiece to provide a desired gear shape. Therefore, the grinding wheel or lapping grindstone revolves while rotating on its axis with respect to the workpiece for grinding or lapping the actual mesh parts with the workpiece, thereby providing a gear shape in the same contact state as they are meshed together. Although sufficient grinding and lapping can be performed by eccentric synchronous movement, the grinding wheel, lapping grindstone, etc., are driven in the direction parallel to the rotation axis thereof, namely, the rotary head section holding the tool is driven up and down by the Z axis feed mechanism for relative reciprocating of the tool along the tooth trace of the gear shape being machined, thereby grinding and lapping the workpiece more efficiently and accurately. Furthermore efficient machining can be performed by applying the relative reciprocating motion by high-frequency vibration. Therefore accurate machining can be performed by applying the normal reciprocation motion and the reciprocating motion by high-frequency vibration. The high-frequency vibration is performed by the Z direction feed mechanism.

Next, described as a fifth embodiment are a tool and an apparatus for measuring an error of the machined workpiece shape after a workpiece is machined to a desired gear shape after being subjected to a sequence of electric discharge machining, grinding, and lapping with the workpiece chucked in the apparatus shown in FIG. 1.

Figure 15:
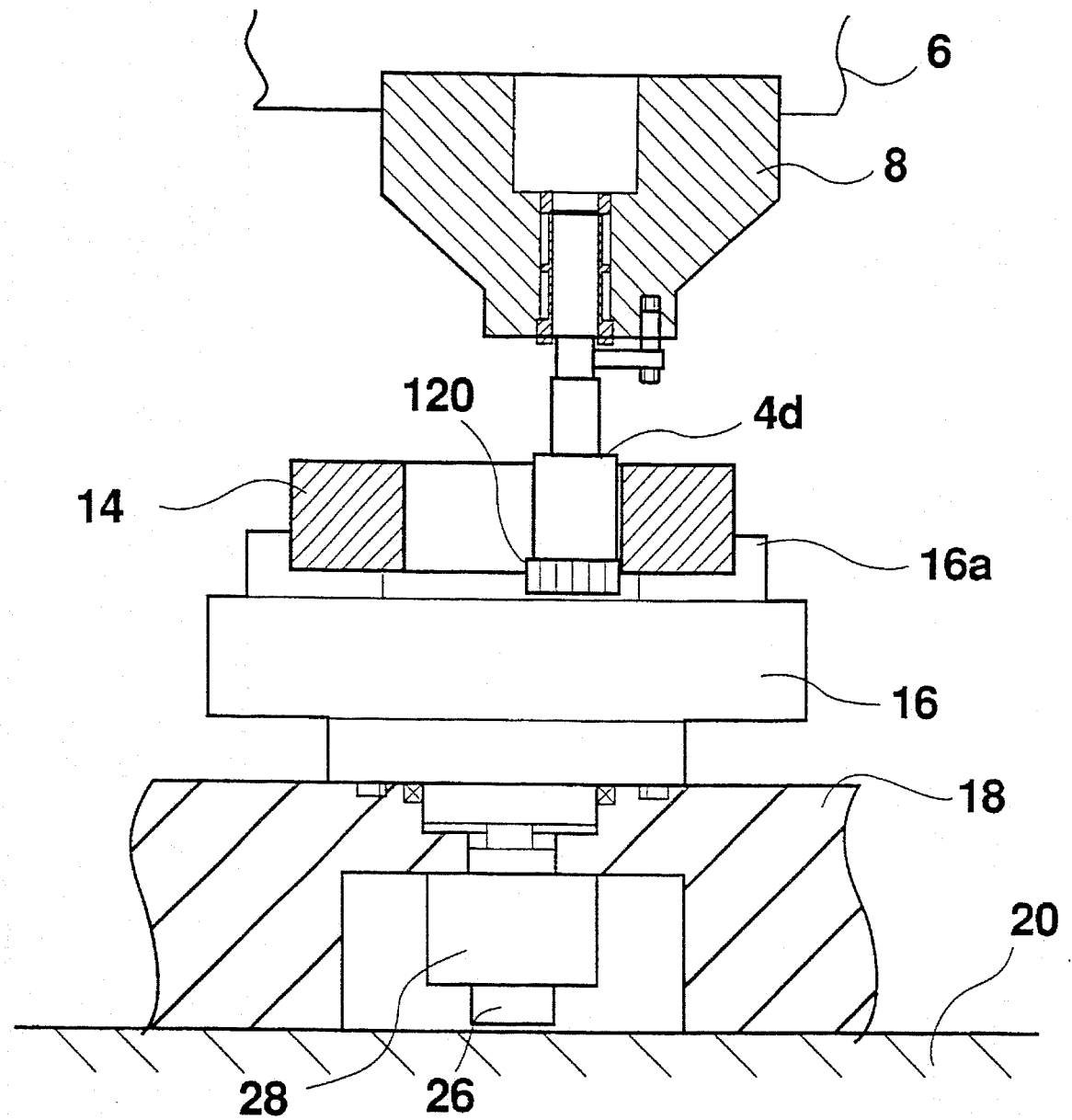
FIG. 15 is a partial sectional side view illustrating the positional relationship between a workpiece and a form master gear in a measuring method of a gear shape according to the invention.

The configuration shown in FIG. 15 is the same as that of the apparatus shown in FIGS. 1 and 2 except that a tool 4d for measuring a gear shape is installed in place of the form electrode 4a for electric discharge machining.

Therefore, the configuration of the measuring apparatus of a gear shape will be discussed by again using FIG. 1.

In the machining apparatus shown in FIG. 1, an automatic tool exchanger 2 having a robot arm 2a supplies the measuring tool 4d (a measuring tool conforming to a desired gear shape) instead of the tools for electric discharge machining, etc. The supplied measuring tool 4d is held by a holder 8 interlocked with an index rotation unit 6 having an index positioning device. The holder 8 and the index rotation unit 6 are incorporated in a rotary head section 12 moved up and down along a column 10. The machined workpiece 14 to be measured is fixed by a chuck 16 which has a plurality of clicks 16a and can be located by a rotation mechanism such as a servo motor 28. The chuck 16 is pivotally mounted on a base 18, which incorporates a chuck rotation mechanism. The base 18 is held by a saddle table 20 having a drive mechanism that can be moved in the X and Y axis directions. A cover, which can be opened and closed and surrounds the workpiece 14, the chuck 16, the base 18, etc., to make a uniform measuring environment and secure the worker against danger during working, is provided on the top of the saddle table 20. In the fifth embodiment, the processing tank 22 in the preceding embodiments is used as the cover.

Further, a control unit 25 of a measuring result display section 25a, a drive controller for driving the apparatus 1, etc., is located on the top of the apparatus 1.

The configuration of the measuring tool 4d used to measure a gear shape by the apparatus 1 having the configuration described above will be discussed.

Figure 16:
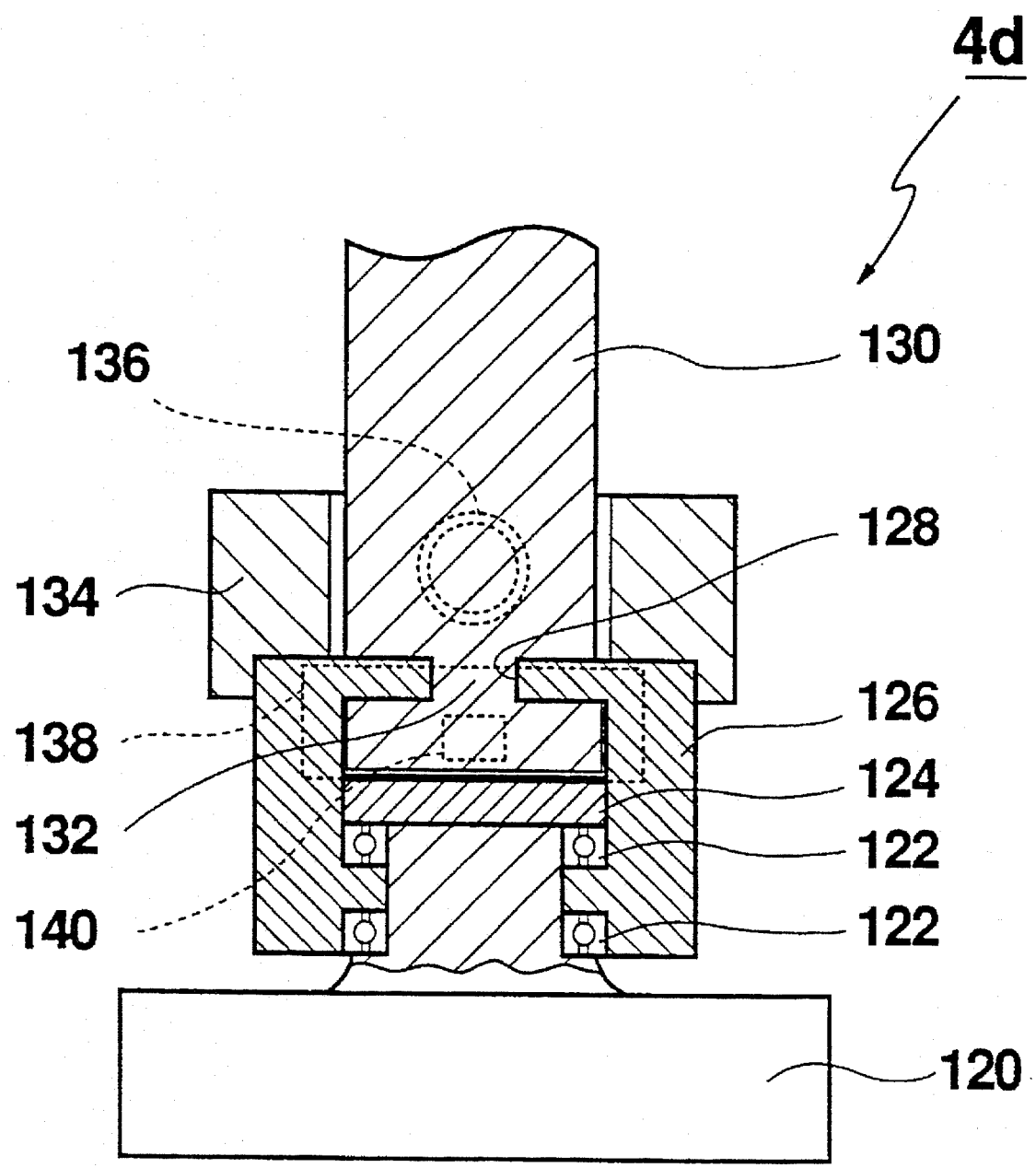
FIG. 16 is a partial sectional view illustrating a measuring tool in an apparatus for measuring a gear shape according to a fifth embodiment of the present invention.
Figure 17:
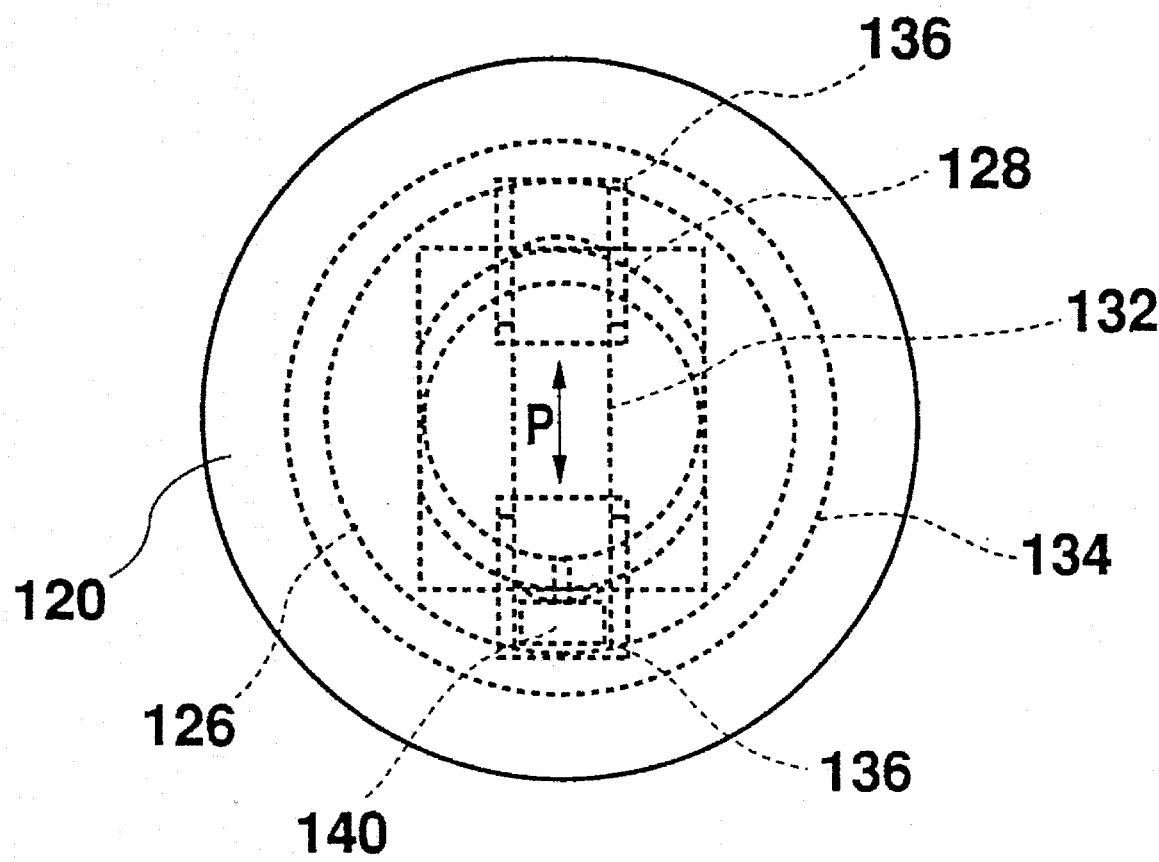
FIG. 17 is a low end view illustrating the measuring tool in the apparatus for measuring a gear shape according to the fifth embodiment of the present invention.

The measuring tool 4d has a form master gear 120 which has gear dimensions of a desired gear shape and rotates while it is engaged with a workpiece machined to the gear shape. FIGS. 16 and 17 show an example of the measuring tool 4d in detail. The form master gear 120 is pivotally attached via bearings 122 to a slide holder 126 with a retainer 124. A U groove 128 is formed in the center of the top of the slide holder 126. A main shaft 130 held by the holder 8 in the apparatus 1 (see FIG. 1) is engaged with the slide holder 126 via the U groove 128. This means that the slide holder 126 is engaged slidably in the vertical direction to the rotation axis of the form master gear 120 along a slide neck 132 of the main shaft 130. A thrust block 134 is fixed to the slide holder 126 and a pair of springs 136 are disposed with the main shaft 130 between in the slide direction of the slide holder 126 for always energizing the slide holder 126 in the center direction. A minute displacement detection sensor 140, as a sensor of an error detection section (not shown) described below, is mounted on a sensor installation stand 138, attached to a part of the slide holder 126, having a plane parallel to the rotation axis of the form master gear 120.

The form master gear 120 of the measuring tool 4d having the structure as described above is rotated by rotation force of a workpiece while it is meshed with the workpiece machined to the gear shape machined. This means that the measuring tool 4d rotates so as to be driven by the workpiece. At this time, if a shape error exists between the form master gear 120 and the workpiece, the workpiece causes the form master gear 120 to be displaced in the arrow P direction in FIG. 17 together with the slide holder 126 against energy of the spring 136. This displacement is detected by the minute displacement detection sensor 140, and machining accuracy such as mesh accuracy of the gear shape of the workpiece machined is displayed on the measurement result display section 25a (see FIG. 1).

Further, described as a sixth embodiment are a method and a tool for measuring a gear shape whereby unnecessary external force produced when a form master gear comes in contact with a workpiece can be excluded for more precise measurement of the gear shape.

In the sixth embodiment, a workpiece of a gear shape and a gear shape measuring tool, which are supported so that they can rotate on their axes, are rotated independently for mesh movement on an ideal mesh path, thereby excluding unnecessary external force applied to both of the workpiece and measuring tool, strictly, both of the workpiece and form master gear. At this time, a correction control amount applied to the form master gear and workpiece for performing mesh movement thereof on the ideal mesh path and a shift amount of the form master gear are detected as displacement, which is measured as a shape error of the workpiece.

Figure 18:
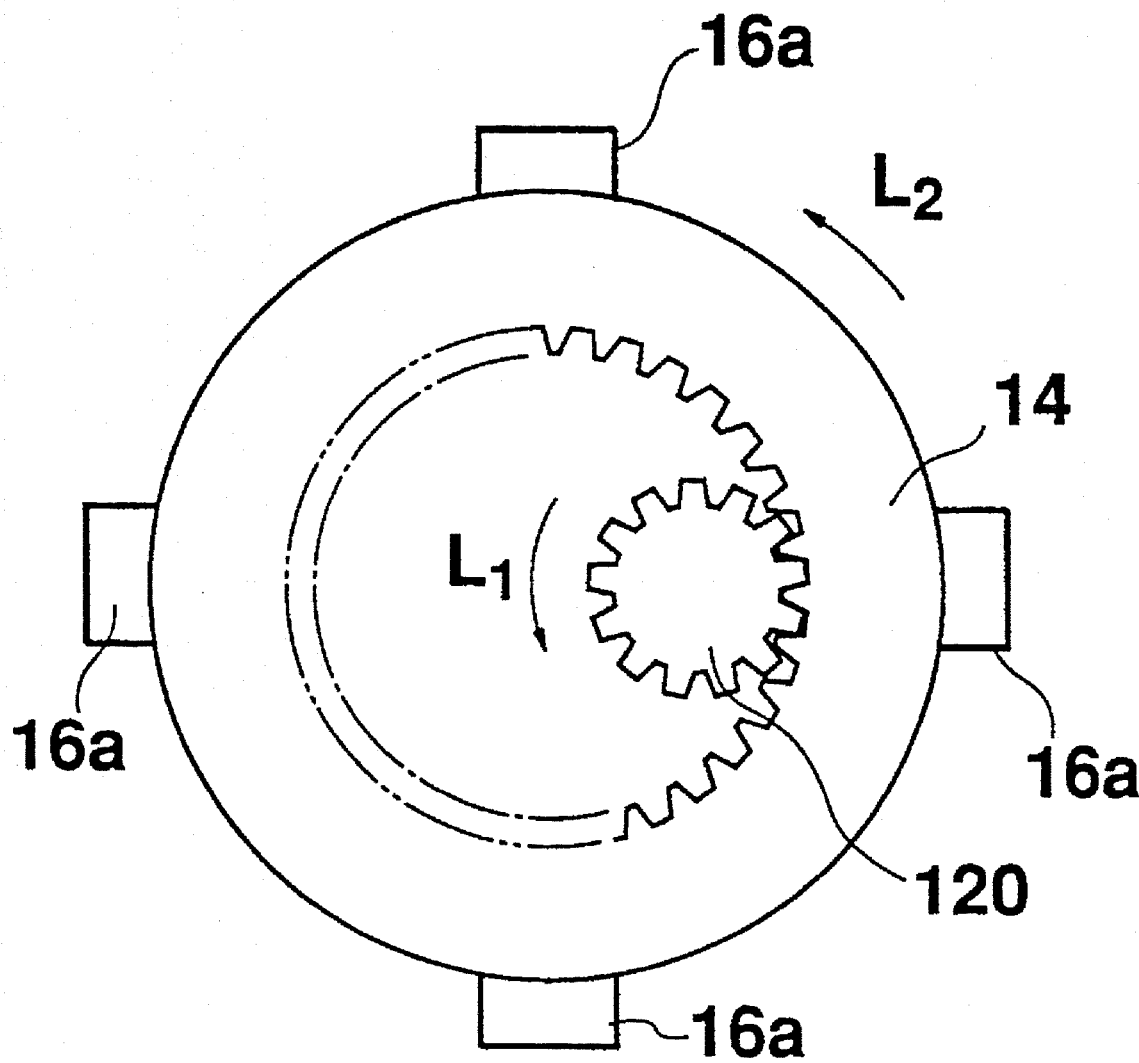
FIG. 18 is an illustrating showing the positional relationship between a workpiece and a form master gear in an apparatus for measuring a gear shape according to the sixth embodiment of the present invention.

Like the fifth embodiment, the sixth embodiment can be provided by using the apparatus shown in FIG. 1, and therefore will be described with reference to FIG. 1. As shown in FIG. 18, workpiece 14 and form master gear 120, which are rotated on their axes by their respective driving sources, move synchronously as a planet pinion gear and an internal gear of a planet gear mechanism movement while they are meshing with each other. The form master gear 120, which has a predetermined gear shape of a measuring tool 4d attached to a holder 8 at the machine center of the apparatus 1, rotates on its axis in the arrow $L_1$ direction in FIG. 18 on the internal circumference of the workpiece 14 held by a plurality of clicks 16a of a chuck 16. At the time, the form master gear 120 is located so as to energize the workpiece 14 by given energy in the diameter direction (right direction in FIG. 18) to detect a delicate shape error of the workpiece 14. On the other hand, the workpiece 14 is pivotally mounted on a base 18 held by a saddle table 20 and rotates in the arrow $L_2$ direction in FIG. 18 together with the form master gear 120. At this time, the chuck 16 holding the workpiece 14 is rotated by a workpiece rotating servo motor (not shown) which can perform feedback control while it is monitored so that the workpiece 14 follows the rotation speed of the form master gear 120 by a chuck rotation position and speed detection section (not shown) installed in the base 18.

Therefore, they rotate on their axes while they are controlled by separate driving sources so that the workpiece 14 follows the form master gear 120. Therefore, normally, force worked between the form master gear 120 and the workpiece 14 is only the force for energizing the workpiece 14 by the form master gear 120 in the diameter direction (right direction in FIG. 18) to detect a delicate shape error of the workpiece 14. If the workpiece 14 is machined as the shape requested by the form master gear 120, pressure of pushing mutual gear faces does not work between the form master gear 120 and the workpiece 14. Mesh movement 1s performed along the ideal mesh path without performing correction control of the rotation speed of the workpiece 14 and without shifting the rotation axis or speed of the form master gear 120.

On the other hand, if the workpiece is not machined as the shape requested by the form master gear 120, namely, if the workpiece 14 contains a machining error, the workpiece 14 performs correction control so that its rotation speed is fitted to the rotation speed of the form master gear 120, and causes the rotation axis and speed of the form master gear 120 to shift during mesh moving. The correction control of the rotation speed of the workpiece 14 and delicate shift amount of the form master gear 120 are detected by a detection section to calculate a shape error between the workpiece 14 and the form master gear 120.

A structure example of the shift amount detection section of the measuring tool 4d having the form master gear 120 is given by using FIGS. 19 to 22.

Figure 19:
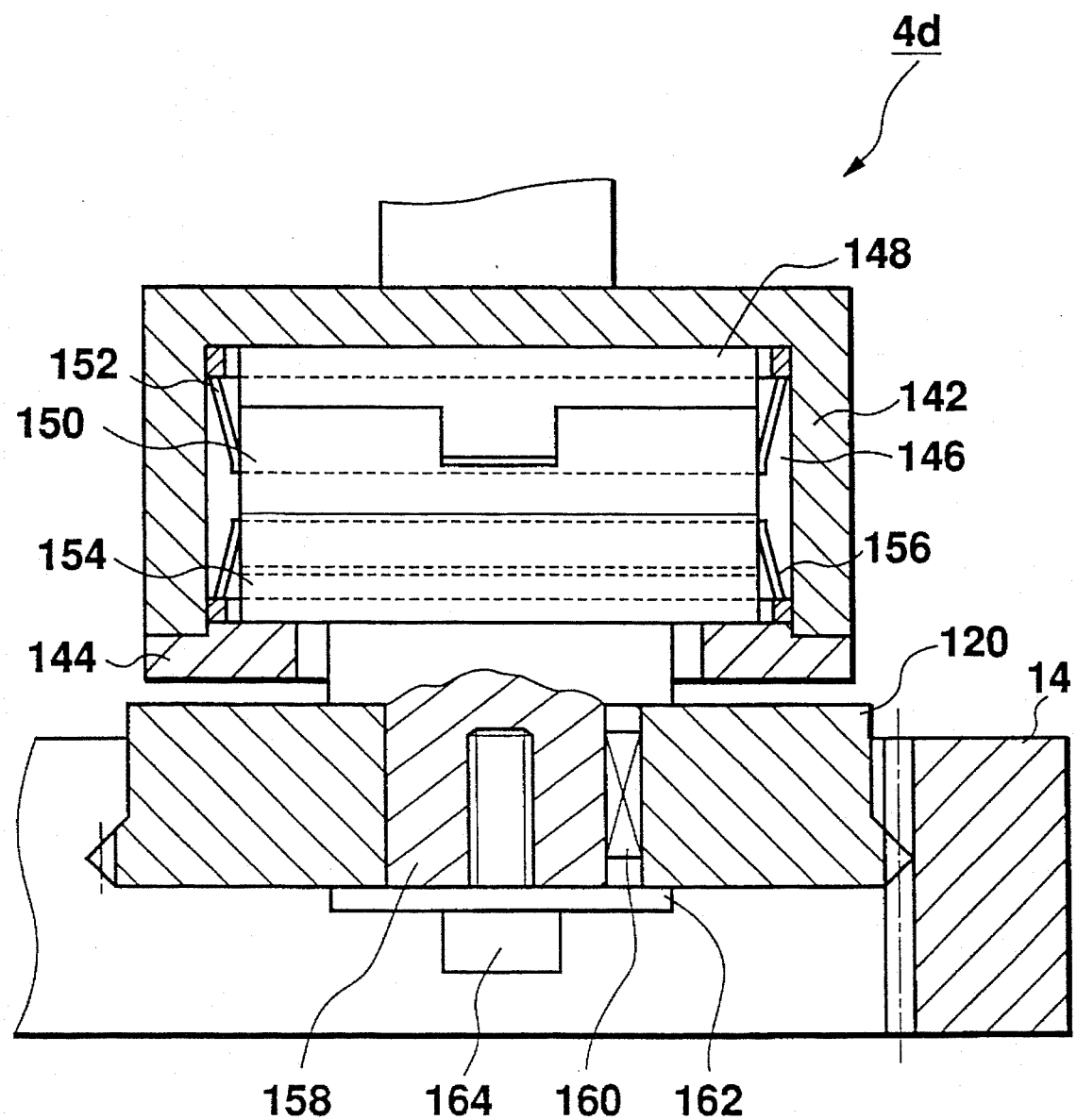
FIG. 19 is a partial sectional view of a measuring tool in the apparatus for measuring a gear shape according to the sixth embodiment of the present invention.

FIG. 19 is a longitudinal sectional view of the measuring tool 4d, wherein a case 142 integrated or built into the measuring tool 4d and a cover 144 of the case 142 form a space 146. An Oldham coupling 150, which slides only in one direction, is located in an Oldham coupling 148 contained in the space 146 and fixed to the case 142. The Oldham coupling 150 is energized so as to always return in the center direction by a plate spring 152 linked like a tea whisk on the circumference. Further located is an Oldham coupling 154 which slides in only one direction at right angles to the Oldham coupling 150. Like the Oldham coupling 150, the Oldham coupling 154 is also energized so as to always return in the center direction by a plate spring 156 linked like a tea whisk on the circumference. These Oldham couplings are combined into an Oldham coupling which can move in every direction. A retaining shaft 158 for retaining the form master gear 120 is integrated or built into the Oldham coupling 154. The form master gear 120 is fixed to the retaining shaft 158 via a positioning key 160 by a washer 162 and a bolt 164.

Figure 20:
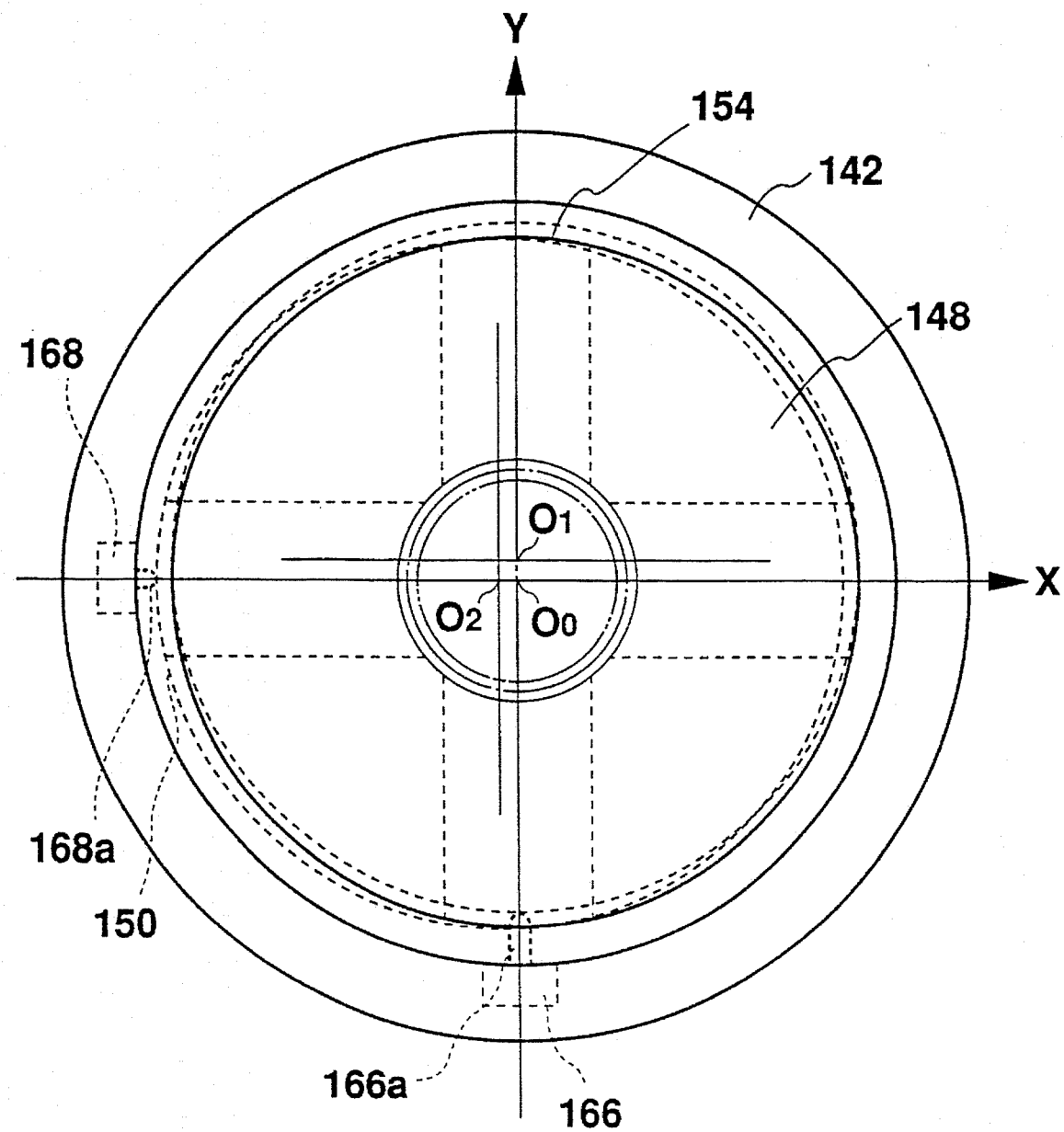
FIG. 20 is an illustration showing the installation state of minute displacement detection sensors of the measuring tool in the apparatus for measuring a gear shape according to the sixth embodiment of the present invention.

Minute displacement detection sensors 166 and 168, as error detection sensors using electricity, magnetism, light, etc., are disposed on the external circumferences of the Oldham couplings 150 and 154, as shown in FIG. 20. As seen from the figure, the minute displacement detection sensor 166, 168 has a slidable sensor head 166a, 168a and detects and outputs the shift amount of the sensor head 166a, 168a with the state in which the Oldham coupling 150, 154 is not displaced as reference. FIG. 20 shows the state in which the state in which the Oldham coupling 150 moves in the Y axis upward direction and the center is displaced from $0_0$ to $O_1$ is detected by the minute displacement detection sensor 166 and the state in which the state in which the Oldham coupling 154 moves in the X axis left direction and the center is displaced from $0_0$ to $0_2$ is detected by the minute displacement detection sensor 168. Although an example in which the minute displacement detection sensor is located on one side of each Oldham coupling is given in the embodiment, it may be provided on both sides and comparison operation is performed on opposite two detection amounts, thereby enabling more accurate measurement.

Figure 21:
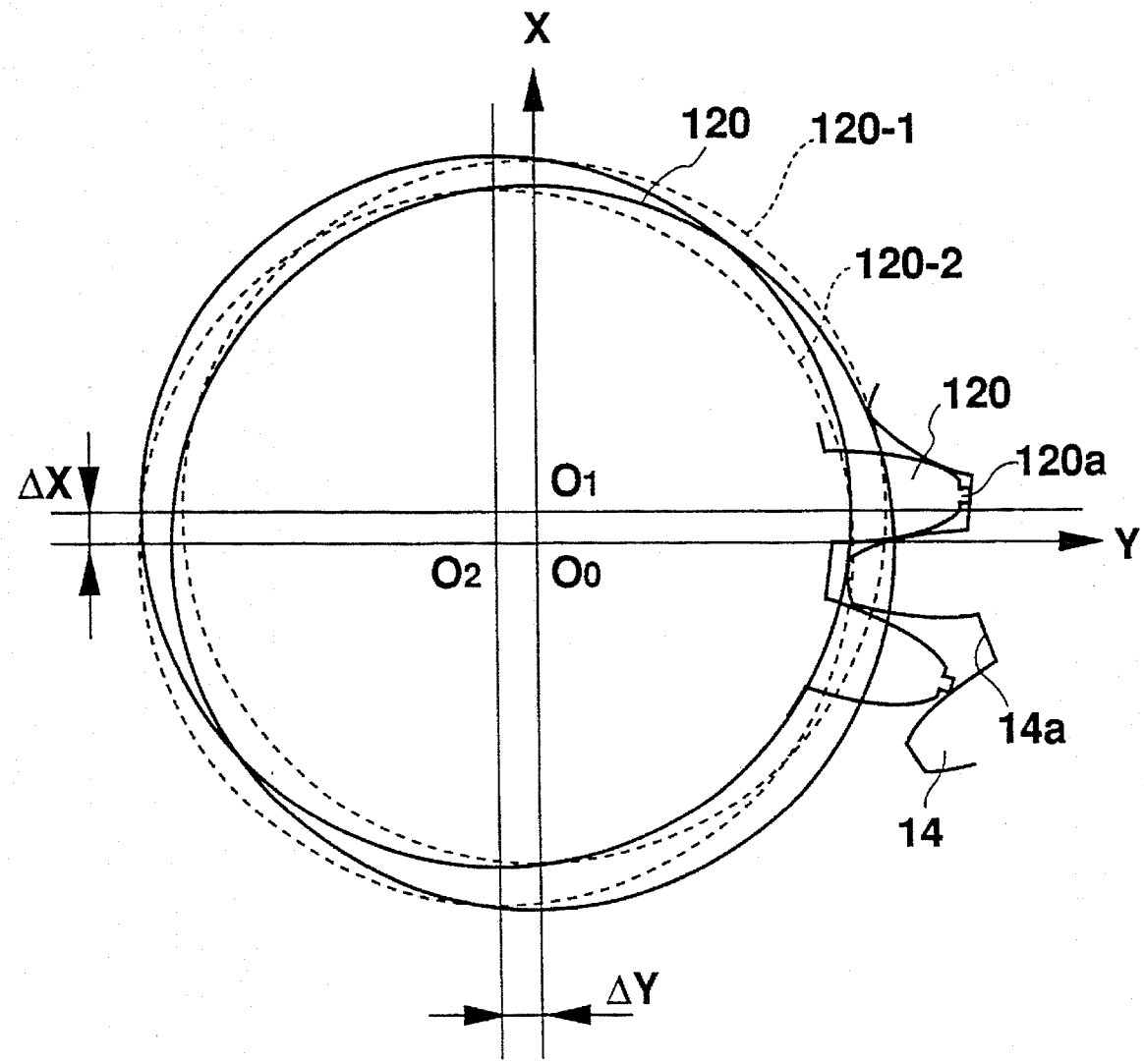
FIG. 21 is an illustration showing the mesh state of a workpiece and form master gear in the apparatus for measuring a gear shape according to the sixth embodiment of the present invention.

FIG. 21 is a drawing showing the state in which the form master gear 120 of the measuring tool 4d is displaced according to the shape of the workpiece 14.

If the workpiece 14 is finished within desired machining accuracy, when the workpiece 14 and the form master gear 120 perform mesh move together, the form master gear 120 performs mesh movement along an ideal mesh path with $0_0$ as the center. However, if the workpiece 14 is finished outside the desired machining accuracy, the Oldham coupling incorporated in the measuring tool 4d is displaced as described above and the form master gear 120 shifts from the ideal mesh movement and performs mesh movement with $0_1$ or $0_2$ as the center shifted Δx or Δy. The minute displacement detection sensor 166,168 detects the difference between the actual mesh movement and ideal mesh movement and performs operation by an operational section, etc., for measuring the gear shape.

In FIG. 21, to precisely detect a shape error in the radial direction of the workpiece 14, a projected part 120a is formed on the tooth tip of the form master gear 120 for complete touch with a tooth bottom part 14a of the workpiece 14.

Figure 22:
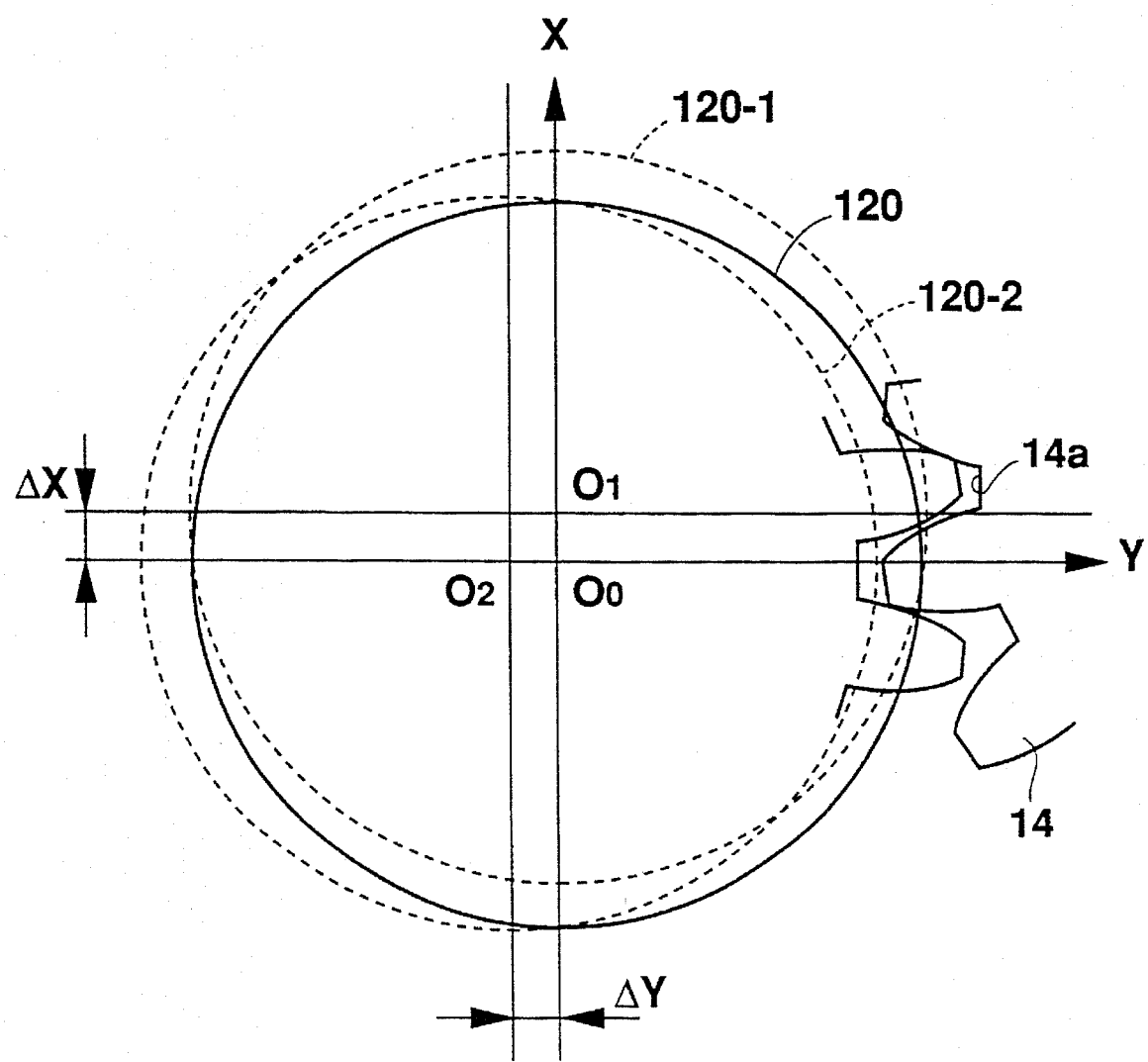
FIG. 22 is an illustration showing the mesh state of a workpiece and form master gear of another shape in the apparatus for measuring a gear shape according to the sixth embodiment of the present invention.

In FIG. 22, the tooth tip of the form master gear 120 is cut to prevent the tooth tip from being in touch with the tooth bottom part 14a of the workpiece 14, thereby precisely detecting a shape error in the circumferential direction of the workpiece 14. Even if the form master gear 120 is displaced, the workpiece 14 corrects its rotation speed in response to the rotation speed of the form master gear 120, thus unnecessary external force is not applied between the workpiece 14 and the form master gear 120. Therefore, precise detection of a shape error according to displacement of the form master gear 120 is made. The shape error of the gear shape is indicated by the shape error detected by displacement of the form master gear 120 and the shape error calculated by correction control of the rotation speed of the workpiece 14.

The gear shape of the workpiece 14 can be measured as required by appropriately selecting the thickness in the tooth trace direction of the form master gear 120. If the form master gear 120 is thickened in the tooth trace direction, a fine shape error of the workpiece 14 cannot be detected, but measurement can be made about the entire balance of the gear when the gear is used.

Figure 23:
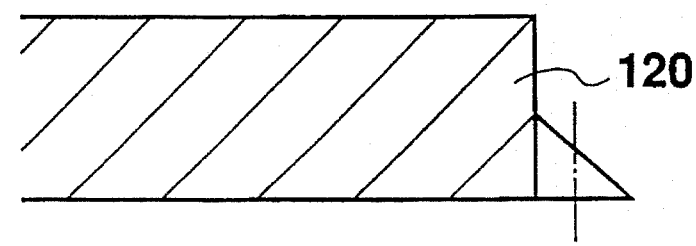
FIGS. 23(A), 23(B), and 23(C) illustrate the gear tip shapes of form master gear in an apparatus for measuring a gear shape according to the sixth embodiment of the present invention.
Figure 23:
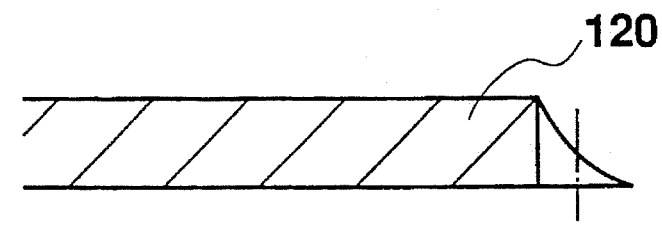
Figure 23:
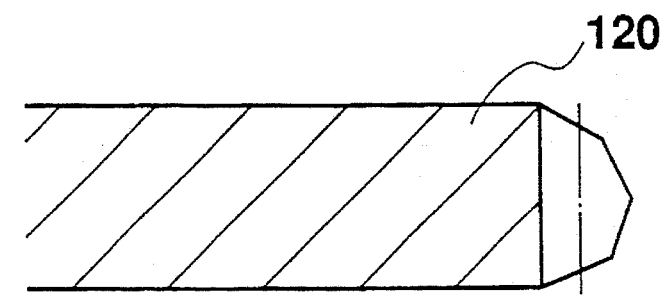

On the other hand, as shown in FIGS. 23(A), 23(B), and 23(C), the form master gear 120 can be thinned in the tooth trace direction for measuring by mesh movement about a very narrow area in the tooth trace direction of a workpiece. Then, the form master gear 120 can be moved by any desired pitch in sequence in the tooth trace direction for detecting a fine shape error of the entire workpiece. Therefore, even if partial gear shape correction is made as a metal mold of a gear, easy determination can be made as to whether displacement of the form master gear is caused by a machining error of the gear shape or correction machining. Although shapes as shown in FIGS. 23(A), (B), and (C) are possible as the shape of the form master gear 120 from points of strength and rigidity, a similar effect can also be provided if the shapes are changed as required. Although shapes of the form master gear as shown in FIGS. 21, 22, 23(A), 23(B), and 23(C) can be applied for the measuring tool illustrated in the fifth embodiment, the similar effect can also be provided.

Figure 24:
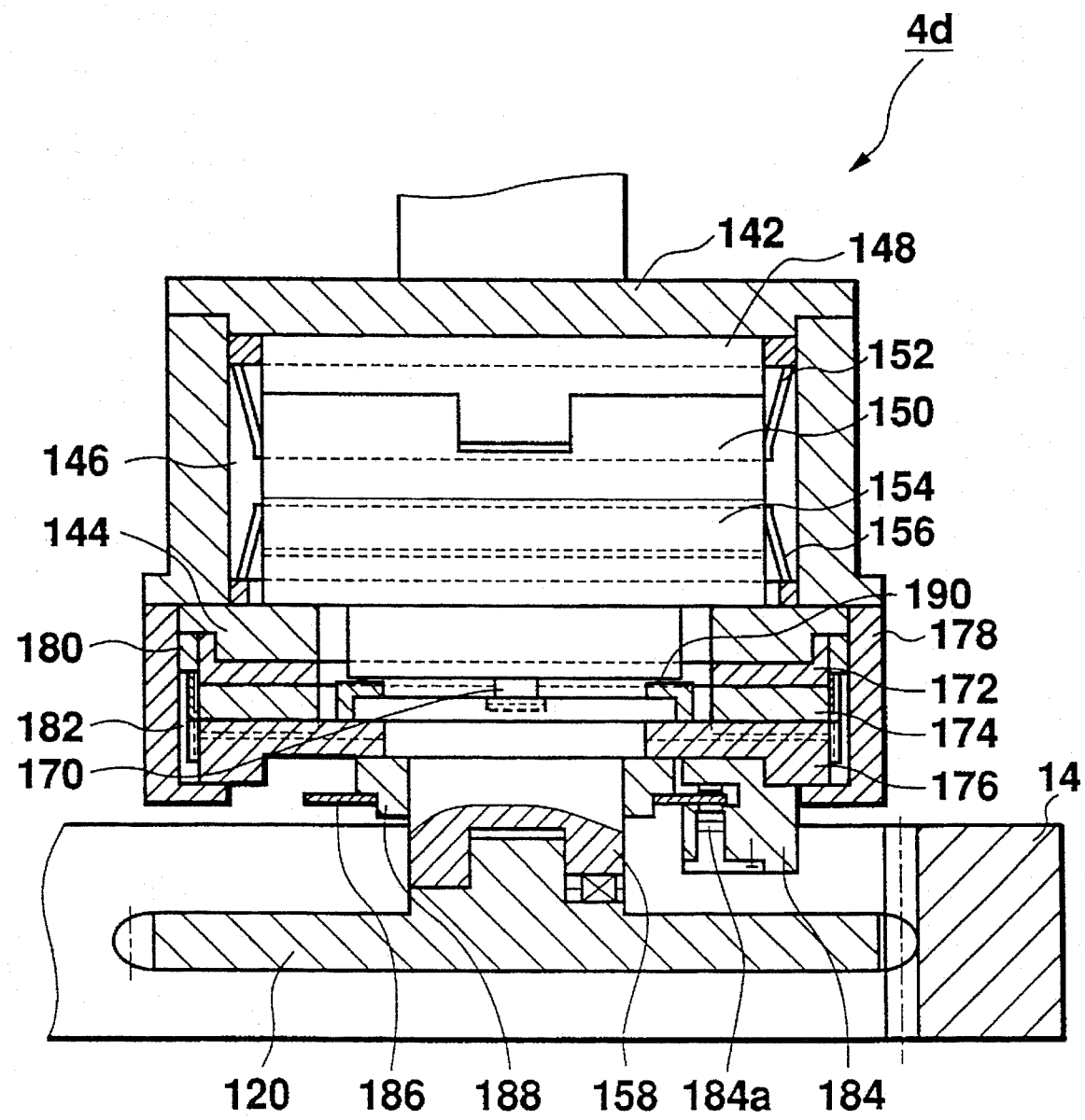
FIG. 24 is a partial sectional view of another measuring tool in the apparatus for measuring a gear shape according to the sixth embodiment of the present invention.

FIG. 24 shows another embodiment of the measuring tool 4d.

The configuration in which an Oldham coupling 148 fixed to a case 142 and Oldham couplings 150 and 154 energized by plate springs 152 and 156 linked like a tea whisk are contained in an upper Oldham coupling section of measuring tool 4d, namely, space 146 formed by the case 142 and a cover 144 thereof is the same as that of the measuring tool 4d shown in FIG. 19. A torsion bar 170 is provided to detect minute displacement in the rotation direction of a form master gear 120 in the embodiment. Lower Oldham couplings 172, 174, and 176 and a lower case 178 are disposed to suppress bend deformation of the junction whose rigidity is lowered because of the installation of the torsion bar 170. Like the upper Oldham couplings 150 and 154, the lower Oldham couplings 174 and 176 are energized so as to always return in the center direction by plate springs 180 and 182 linked like a tea whisk on the circumference. Further, the measuring tool 4d in the embodiment is provided with a rotary encoder to detect minute rotation displacement of the form master gear 120. The rotary encoder consists of, for example, a semiconductor laser, etc.,; a sensor head 184 having a light receiving and emitting section 184a is located at the bottom of the Oldham coupling 176 and a disk 186 having slits to read a movement angle is disposed having rotatable spacing at the light receiving and emitting section 184a. The disk 186 is fixed via an installation stand 188 to a retaining shaft 158 for rotating the form master gear 120 and is adapted so as not to hinder rotation of the retaining shaft 158 in conjunction with a retainer 190 split for installation in order to remove an error caused by bend deformation when a workpiece 14 is measured with the form master gear 120. The measuring tool 4d can also be used to measure an accumulative pitch error and a contiguous pitch error by operating only a unit which detects and outputs minute displacement in the rotation direction.

Figure 25:
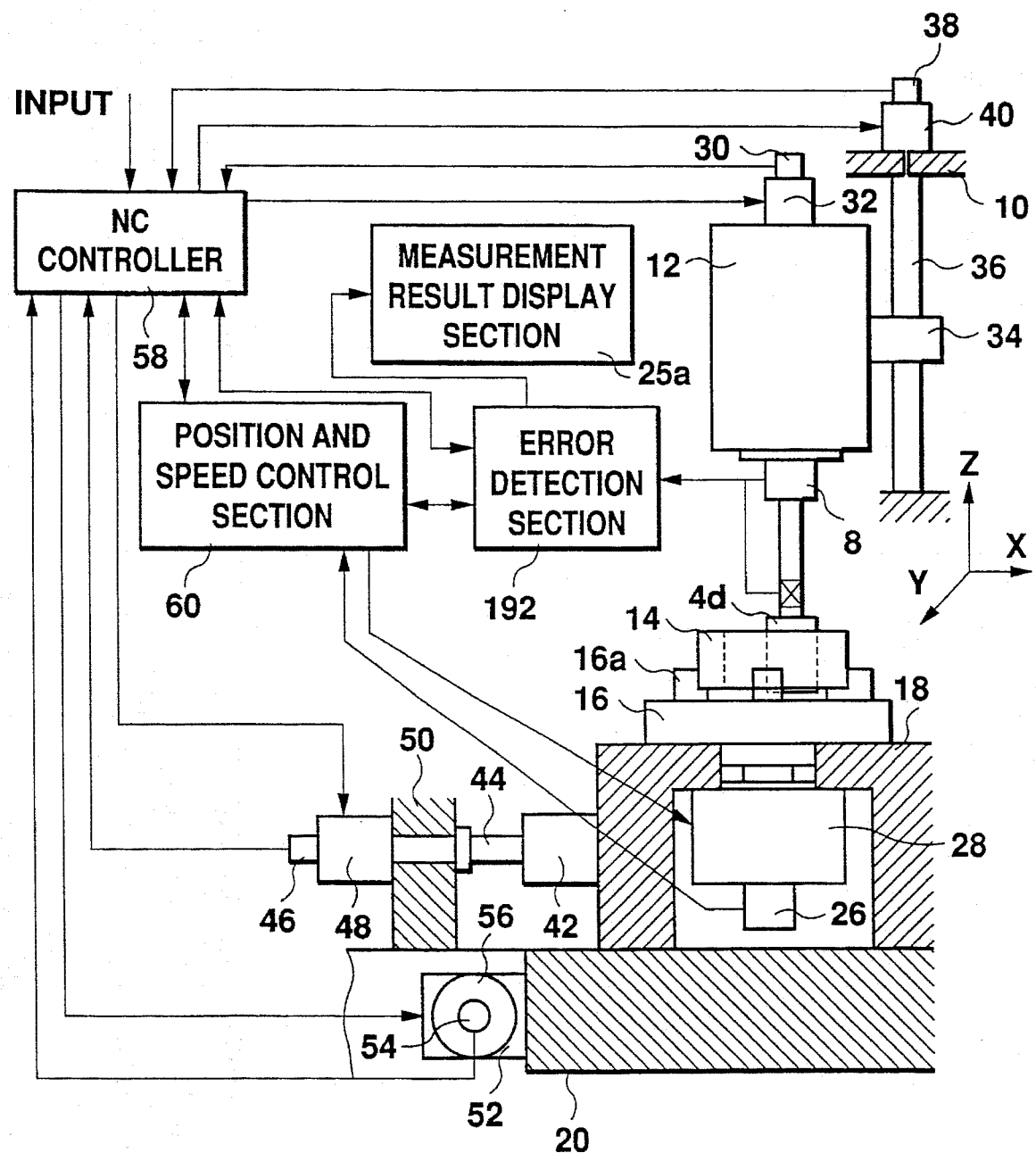
FIG. 25 is an illustration showing the configuration for carrying out mesh movement along an ideal mesh path in the apparatus for measuring a gear shape according to the fifth and sixth embodiments of the present invention.

FIG. 25 is a schematic drawing showing an example of the configuration for carrying out the gear shape measuring method according to the fifth and sixth embodiments. The configuration for rotating the measuring tool following the workpiece in the fifth embodiment can also be realized by the configuration for driving the measuring tool and workpiece independently in the sixth embodiment. The configuration according to the sixth embodiment will be described; mechanical parts identical with or similar to those previously described with reference to FIGS. 4 and 14 are denoted by the same reference numerals in the description to follow.

Measuring tool 4d, which contains a minute displacement detection mechanism of form master gear (not shown), is attached to a holder 8 and is held with a rotary head section 12 containing a tool rotating servo motor 32 having a rotation position and speed detection section 30. The rotary head section 12 is driven up and down by a Z direction feed mechanism. If the Z direction feed mechanism consists of, for example, a ball screw 36, the rotary head section 12 fixed to a female screw section 34 is driven in the Z direction (upward and downward in the figure) accurately by a rotary head driving servo motor 40 which is engaged with the column 10 and has a rotary head rotation position and speed detection section 38.

On the other hand, a workpiece 14 is held by a chuck 16, which has a plurality of clicks 16a and is pivotally mounted on a base 18, and rotates on its axis at a predetermined speed in synchronization with rotation of the measuring tool 4d by a workpiece rotating servo motor 28 which has a chuck rotation speed detection section 26 and Can perform feedback control while monitoring the rotation speed of the chuck 16.

Further, the base 18 on which the chuck 16 is installed is driven in the left or right direction by an X direction feed mechanism. If the X direction feed mechanism consists of, for example, a ball screw 44, the base 18 fixed to a female screw section 42 is driven in the X direction (left or right direction in the figure) accurately by a base driving servo motor 48 which is engaged with a bed 50 and has a base rotation position and speed detection section 46. The saddle table 20 on which the base 18 is installed is driven back and forth by a Y direction feed mechanism. If the Y direction feed mechanism consists of, for example, a ball screw, the saddle table 20 fixed to a female screw section 52 is driven in the Y direction (back and forth in the figure) accurately by a saddle table driving servo motor 56 which has a saddle table rotation position and speed detection section 54. The position of rotary motion of the workpiece 14 can be changed as desired by combining drive in the X direction and that in the Y direction.

The servo motors 28, 32, 48, 56, etc., are controlled by an NC controller 58 so that the related servo motors perform predetermined operation in conjunction with each other. Particularly during measuring, the rotation speed of the tool rotating servo motor 32 for driving the measuring tool 4d is kept accurate by the NC controller 58, and the rotation speed of the workpiece rotating servo motor 28 which performs follow-up operation is controlled by a position and speed control section 60 which always detects and feeds back the rotation position and speed of the workpiece 14 for comparison operation and control. Accurate measuring of a gear shape is performed by an error detection section 192 which performs rotation phase difference operations and displacement detection operations in the radial direction of the measuring tool while moving with signals of the NC controller 58 and the position and speed control section 60. The numeric values and position information calculated by the error detection section 192 are displayed on a measurement result display section 25a.

According to the configuration, measuring in the fifth embodiment can be carried out if drive transmission of the servo motor 32 is cut and the measuring tool 4d shown in the fifth and sixth embodiment can be rotated freely.

Further, if the eccentric rotation mechanism shown in the fourth embodiment is applied to an index rotation unit 6 holding the holder 8 in FIG. 25, the measuring tool 4d can be moved smoothly. Therefore, the form master gear attached to the measuring tool 4d can respond to even a slight change in the shape of the workpiece 14 and further accurate workpiece shape measurement can be performed.

As described above, with a workpiece chucked, gear shape machining such as electric discharge machining, grinding, and lapping and accuracy measurement can be performed by changing the tools used with the apparatus 1 shown in FIG. 1.

Figure 26:
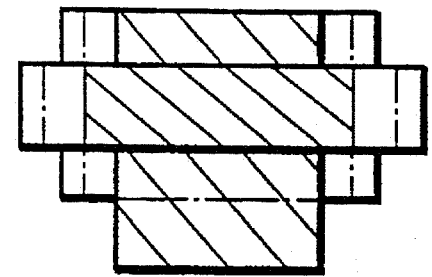
FIGS. 26(A), 26(B), and 26(C) are examples of gears having special shapes that can be machined by a lapping unit according to a seventh embodiment of the present invention.
Figure 26:
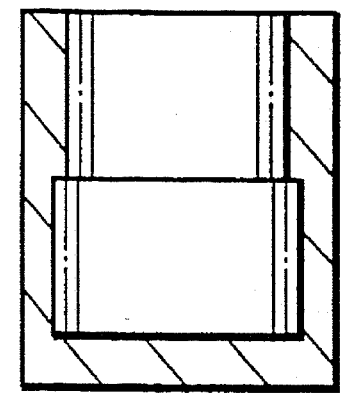
Figure 26:
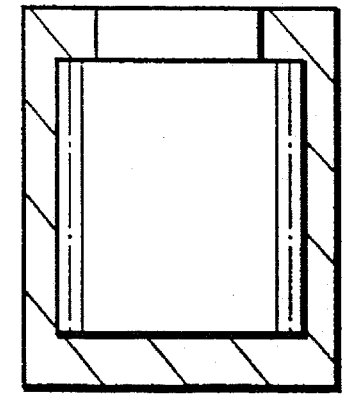

FIGS. 26(A), 26(B), and 26(C) show gears having special shapes. With a workpiece chucked, gear shape machining such as electric discharge machining, grinding, and lapping and accuracy measurement can be performed by changing the tools used with the apparatus 1 shown in FIG. 1, as described above, even for an external gear having small diameter gears at the top and bottom and a large diameter gear, whose deddendum circle diameter is smaller than the addendum circle diameter of the small diameter gear, at the center as shown in FIG. 26(A) and gears where the entrance gear or hole interferes with the deddendum circle diameter as shown in FIGS. 26(B), 26(C). However, a lapping tool can be provided for more accurate and efficient lapping at the final stage of machining a gear shape. Embodiments of the lapping tool are described below.

Figure 27:
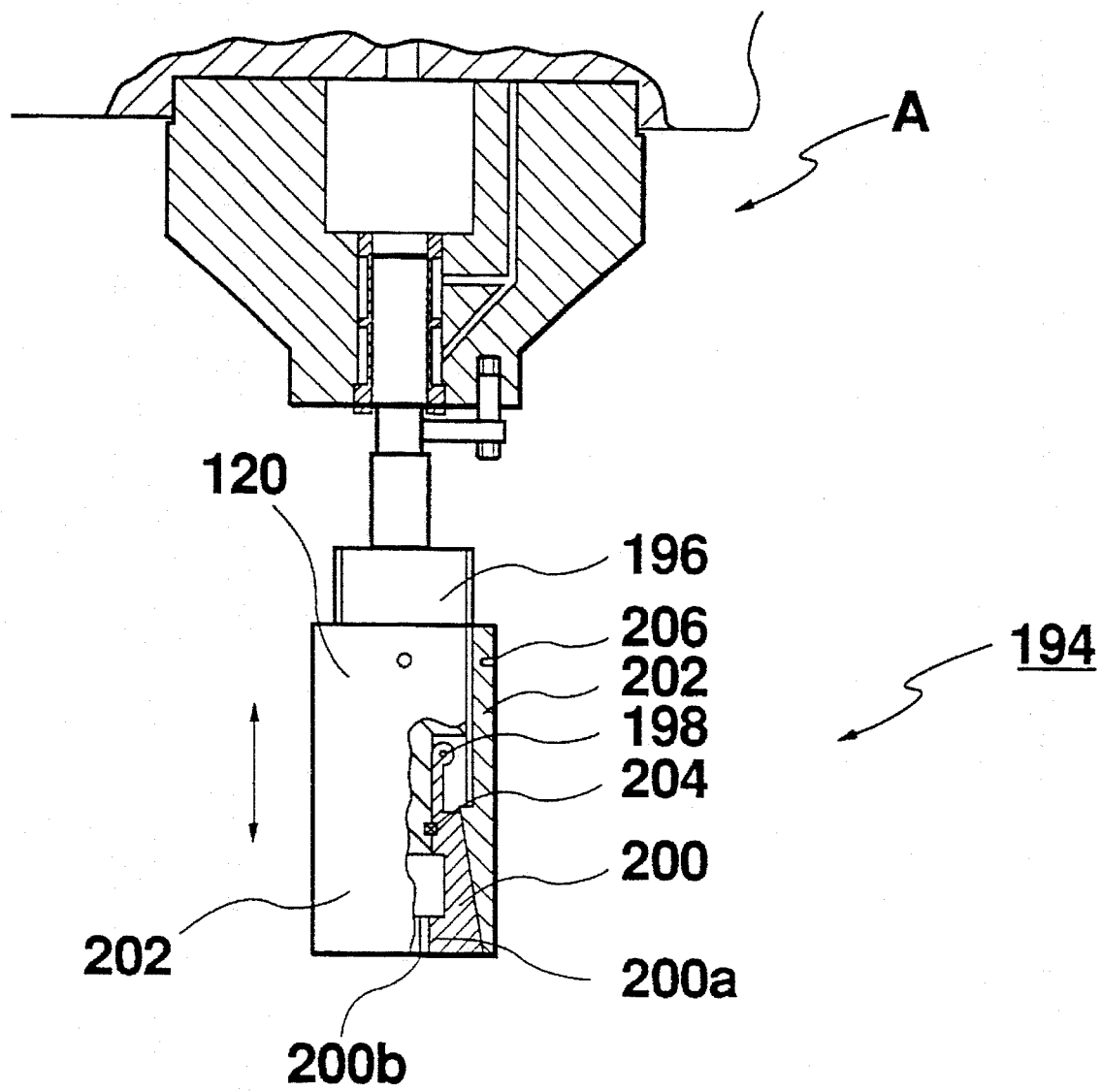
FIG. 27 is a partial sectional view of a lapping unit according to the seventh embodiment of the present invention.

A lapping unit 194 shown in FIG. 27 as a seventh embodiment is a lapping unit of external gears which has a supporter 196, a lapping tool 200 pivotally attached via a pin 198 to the supporter 196, and a taper member 202 as a regulation member located slidably on the external circumference of the supporter 196.

The supporter 196 is substantially like a pillar and has a space to house the lapping tool 200 on the bottom; a screw slot to slide the taper member 202 is formed on the circumference of the supporter 196.

The lapping tool 200 has a taper face on its circumference and a part 200a projected to the axle center side on the inside; it has an outward form whose sectional view is substantially like letter L. A lapping grindstone 200b attached to the tip of the projected part 200a makes contact with a gear for lapping. The lapping tool 200 is attached to the supporter 196 with the pin 196 and can pivot with the pin 196 as the center. The lapping tool 200, which is split into four sections in the circumferential direction, pivots in four directions when it opens in the external circumference directions. A spring 204 as an elastic member is attached between the supporter 196 and the lapping tool 200 for energizing the lapping tool 200 in the outer direction.

The taper member 202 is substantially cylindrical and has a taper face sliding on the taper face of the lapping tool 200 on the inside of the bottom. It also has a rotating tool insertion hole 206 to slide the taper member 202 up and down with respect to the supporter 196. A rotating tool (not shown) is fitted into the rotating tool insertion hole 206 and the taper member 202 is rotated on the principles of a lever for sliding the taper member 202 up and down. That is, by sliding the taper member 202 upward, the lapping tool 200 is opened by the energy of the spring 204; in contrast, if the taper member 202 is slid downward, the lapping tool 200 slides along the taper face and is closed. FIG. 27 shows the closed state.

How the lapping unit 194 thus configured is operated is described.

To use the lapping unit 194, it is held by the holder 8 in the apparatus 1 shown in FIG. 1 and driving the servo motors of the apparatus 1 is controlled, thereby moving the lapping unit 194 up and down with respect to a workpiece. The operating state of the lapping unit 194 is described with reference to FIG. 1 and its relevant drawings.

For example, to machine a gear at the lower stage of a multiple stepped gear as shown in FIG. 26(A), first the lapping unit 194 is mounted on the holder 8 by an automatic tool changer 2. Then, the taper member 202 of the lapping unit 194 is slid upward to open the lapping tool 200. The lapping unit 194 held by the holder 8 is moved downward by a Z direction feed mechanism driven by the head section driving servo motor 40 shown In FIG. 4 to locate the lapping unit 194 at a predetermined position. Then, the phase of the lapping tool 200 is matched with that of the gear. Then, while the lapping unit 194 is moved up and down by the Z direction feed mechanism, the lapping tool 200 is closed gradually for lapping. When finally the lapping tool 200 eventually closes completely and the entire machining face of the lapping tool 200 is in contact with the gear, the lapping completes. The upper and center gears shown in FIG. 26(A) are lapped by the lapping unit to which are attached different lapping tools, namely, lapping tools such that the state in which the lapping tool 200 is closed completely fits the gear dimensions of the gear to be machined.

Here, by adjusting strokes of the taper member 202 properly, a work allowance amount can be adjusted and increased gradually. Although the width of the lapping grindstone 200b attached to the projected part 200a is as desired, the narrower the width, the less the lapping grindstone 200b interferes with a gear when it is closed. However, the slide distance in the tooth trace direction of the lapping unit 194 lengthens and the machining efficiency lowers. By accurately controlling work strokes in the axial direction of the lapping tool 200, machining can be performed up to the root of a stopped part within limits in which the lapping tool 200 enters. The number of splits of the lapping tool 200 and whether the taper face shape is made a cone or pyramid vary depending on the gear dimensions and machining conditions; it is desired to split the lapping tool into three or more sections for accurate machining.

As described above, with a workpiece retained with the chuck 16, the workpiece can be lapped automatically to gears which differ in gear dimensions, thereby automating all steps of electric discharge machining, grinding, and lapping of gears and gear shapes for improvement in product accuracy and productivity and low costs.

Figure 28:
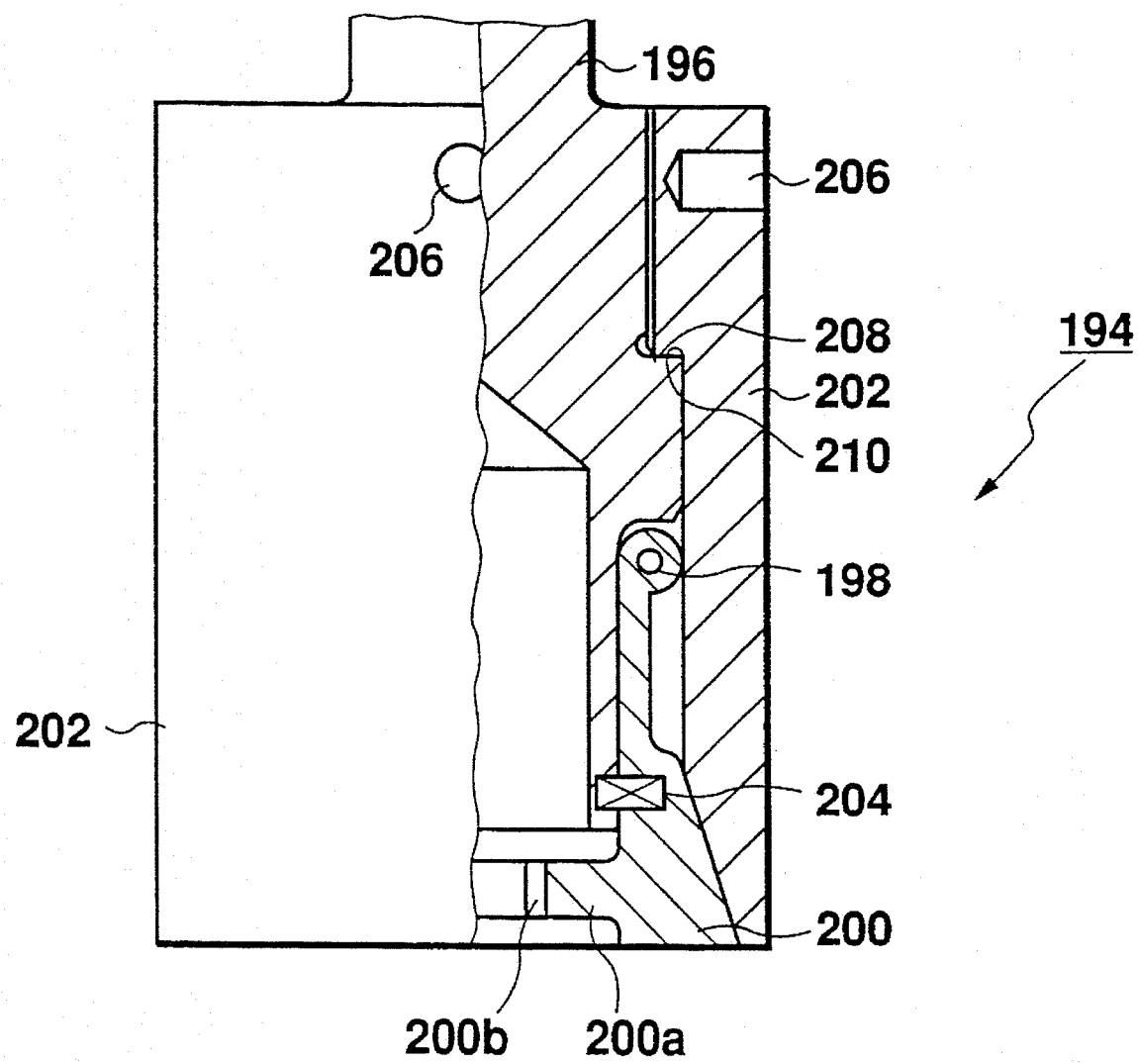
FIG. 28 is a partial sectional view of a lapping unit according to an eighth embodiment of the present invention.

Next, a lapping unit shown as an eighth embodiment is configured as shown in FIG. 28. Parts identical with or similar to those previously described with reference to FIG. 27 are denoted by the same reference numerals in the description to follow and will not be discussed again.

Lapping unit 194 shown in FIG. 28 is the same as the lapping unit according to the seventh embodiment in that taper member 202 is slid up and down by rotating the taper member 202 pivotally mounted to supporter 196 and that lapping tool 200 pivotally mounted to the supporter 196 via pin 198 is opened and closed by sliding the taper member 202 and the energy of spring 204. The number of splits of the lapping tool 200 in the eighth embodiment is also the same as that in the seventh embodiment, that is, four. However, the eighth embodiment differs from the seventh embodiment in the shapes of the supporter 196, lapping tool 200, and taper member 202. For example, stepped parts 208 and 210 are formed on the upper external circumference of the supporter 196 and on the upper internal circumference of the taper member 202 and serve as stoppers. That is, when the stepped part 210 of the taper member 202 arrives at the stepped part 208 of the supporter 196, the lapping tool 200 is fully closed.

How the lapping unit 194 is operated in the eighth embodiment is almost the same as that in the seventh embodiment. After the lapping tool 200 is located at a predetermined position in the axial direction when it is open, the phase of the lapping tool 200 is matched with that of a given gear. Then, a rotating tool is inserted into a rotating tool insertion hole 206 and the taper member 202 is rotated gradually for downward movement, thereby increasing the work allowance of the gear gradually. The gear is machined until the stepped part 210 of the taper member 202 touches the stepped part 208 of the supporter 196. Then, the gear can be machined to the normal dimensions.

Figure 29:
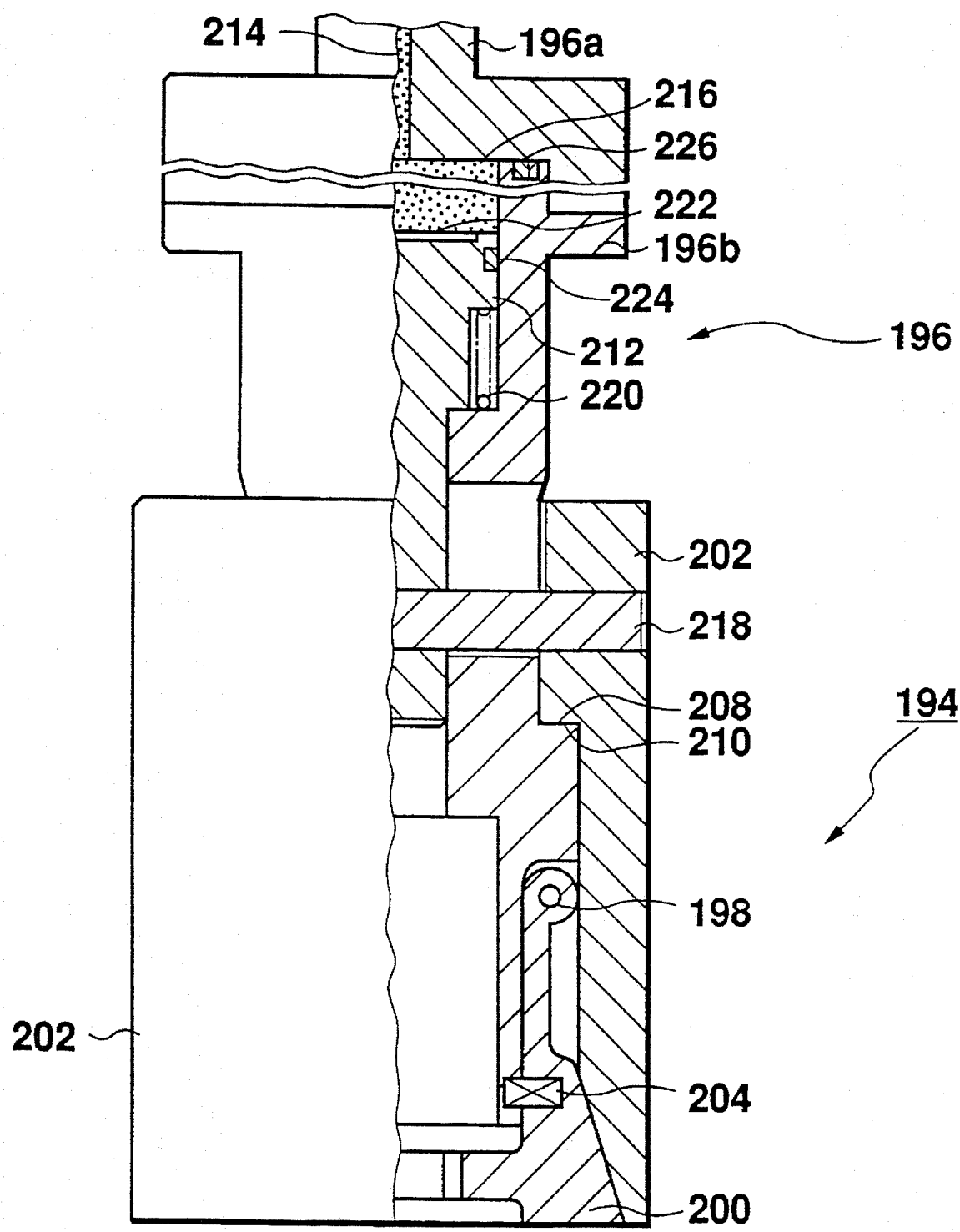
FIG. 29 is a partial sectional view of a lapping unit indicating the state in which a lapping tool is closed according to a ninth embodiment of the present invention.
Figure 30:
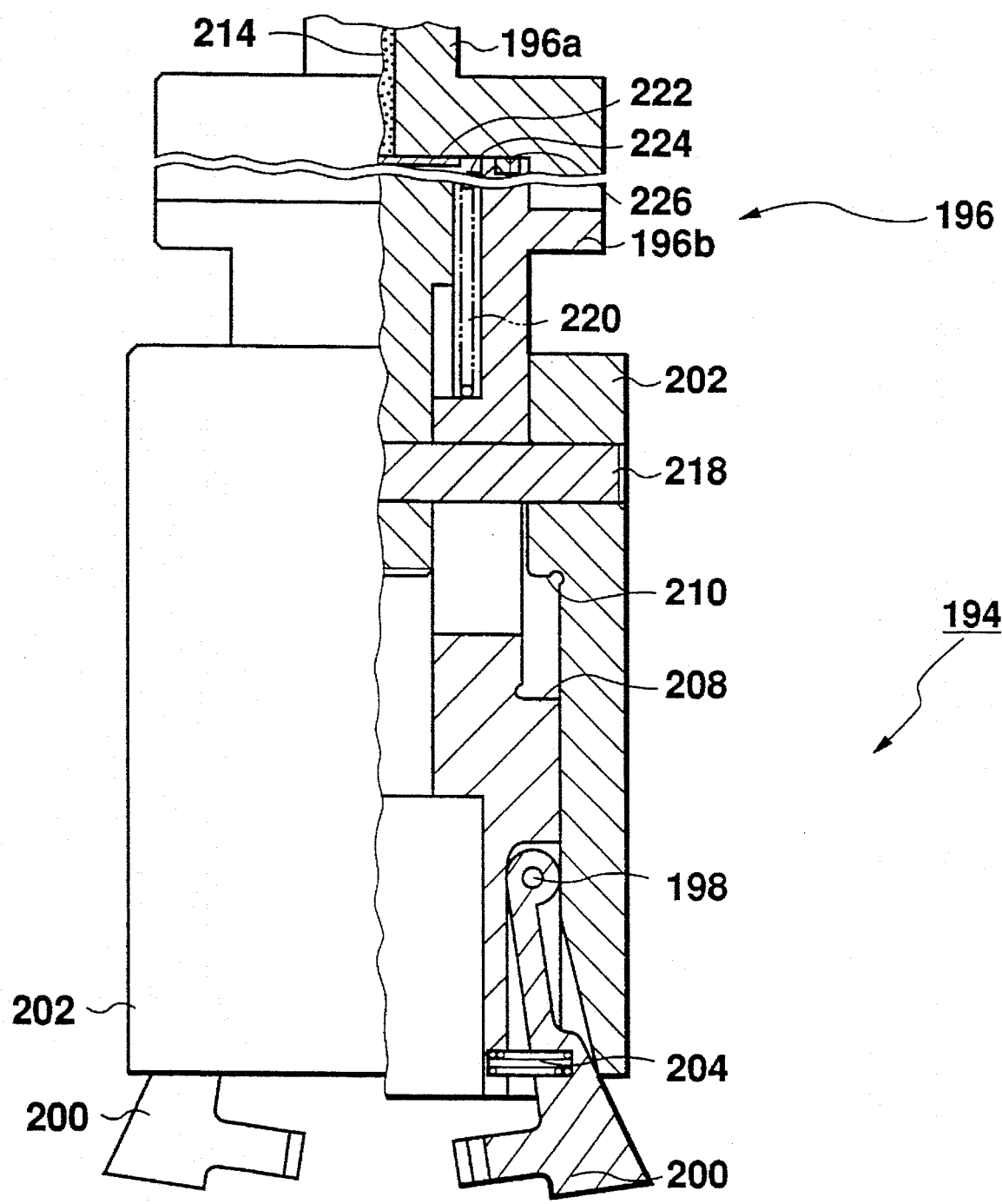
FIG. 30 is a partial sectional view of the lapping unit indicating the state in which the lapping tool opens according to the ninth embodiment of the present invention.

In a lapping unit shown as a ninth embodiment, a lapping tool 200 is pivotally fixed via a pin 198 to a supporter 196 consisting of a supporter base 196a and a supporter main unit 196b, as shown in FIGS. 29 and 30.

A taper member 202 is installed on the external circumference of the supporter 196 and the lapping tool 200 as in the seventh and eighth embodiments. The ninth embodiment is characterized by the fact that a piston rod 212 is installed on the inside of the supporter main unit 196b, that a supply member 216 such as oil or air is supplied from a supply unit (not shown) to a passage 214 formed in the supporter base 196a and its supply amount is adjusted, and that, as a result, the piston rod 212 is moved up and down for adjusting the position of the taper member 202.

That is, the taper member 202 is fixed via a pin 218 to the piston rod 212, which is energized upward by a spring 220 installed between the piston rod 212 and the supporter main unit 196b. Therefore, the taper member 202 moves downward by pressing the supply member 216 through the passage 214 to a pressure reception face 222 of the piston rod 212.

In contrast, as the piston rod 212 moves upward, the taper member 202 also moves upward. Therefore, the lapping tool 200 opens in the outer circumference direction by the energy of a spring 204. When the piston rod 212 moves downward, in contrast, the lapping tool 200 closes. FIG. 29 shows the state in which the taper member 202 is at the bottom position and the lapping tool 200 closes. Upon completion of lapping, the taper member 202 comes to this position. FIG. 30 shows the state in which the taper member 202 is at the top position. This state is entered when the lapping tool 200 is inserted into a gear or when the lapping tool is detached from the gear after completion of lapping. 0 rings 224 and 226 are provided to prevent a supply member 216 such as oil or air from leaking.

How the lapping unit 194 is operated in the ninth embodiment is almost the same as that in the seventh and eighth embodiments except for the method of moving the taper member 202 up and down. After the lapping tool 200 is located at a predetermined position in the axial direction when it is open, the phase of the lapping tool 200 is matched with that of a given gear. Then, the supply member 216 such as oil is supplied, thereby moving the taper member 202 downward for increasing the work allowance of the gear gradually. The gear is machined until a stepped part 210 of the taper member 202 touches a stepped part 208 of the supporter 196. Then, the gear can be machined to the normal dimensions.

Figure 31A:
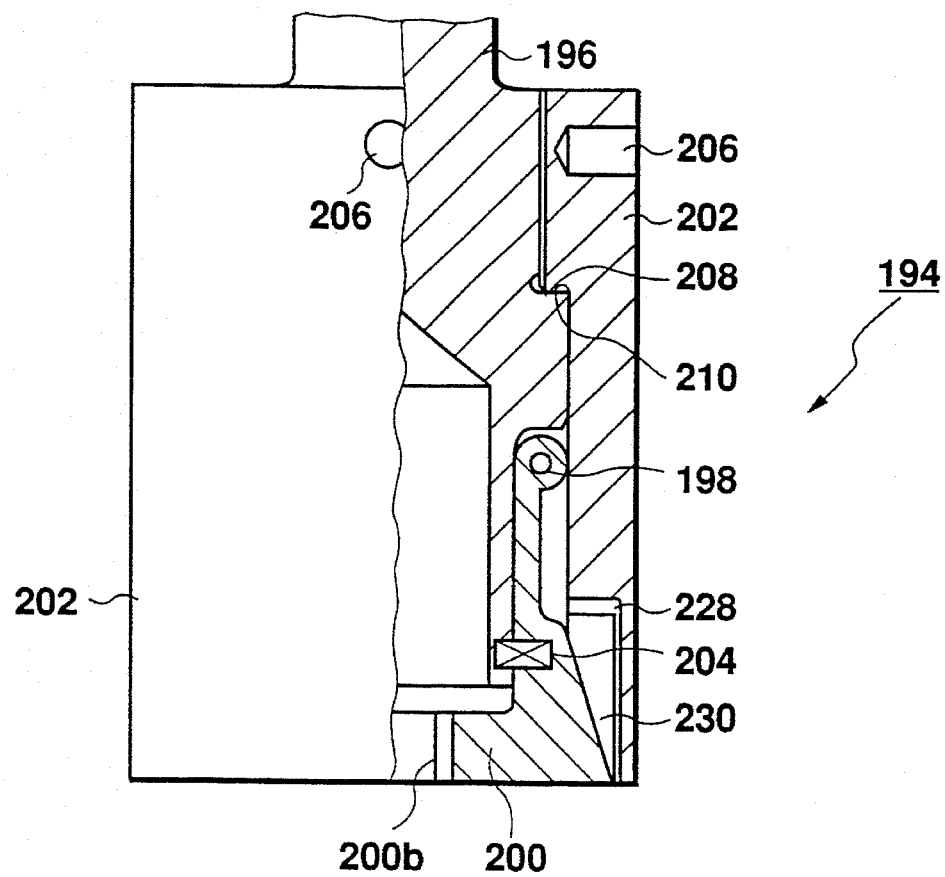
FIG. 31(A) is a partial sectional view of a lapping unit according to a tenth embodiment of the present invention.
Figure 31B:
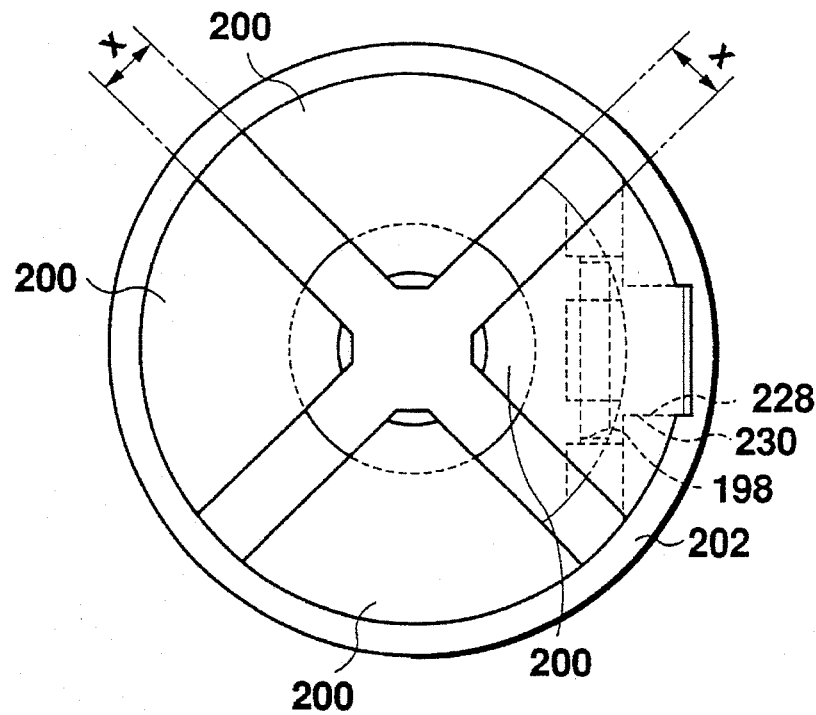
FIG. 31(B) is are end view of the lapping unit according to the tenth embodiment of the present invention.

A lapping unit shown as a tenth embodiment has almost the same configuration as that in the eighth embodiment, as shown in FIG. 31(A); taper member 202 is moved up and down by using a rotating tool. Although the lapping tool 200 has gear shape all around its circumference as shown in FIG. 28 in the eighth embodiment, a clearance having distance X is formed between two of the four sections into which the lapping tool 200 is split, as seen from FIG. 31(B) showing the end face of the lapping unit 194, in the tenth embodiment for relieving the lapping tool 200 of its work load. In the tenth embodiment, a phase determination groove 228 is formed on the internal circumference of the taper member 202 and a protrusion 230 formed on the lapping tool 200 side is engaged with the phase determination groove 228 to keep accurate positioning of the lapping tool 200. Even if clearances are formed, precise lapping is enabled. The distance X of the clearance can be selected appropriately conforming to the gear specifications.

According to the tenth embodiment, the gear machining range is limited to the portion in which a lapping grindstone 200b exists when positioning is performed. However, the relative phase of a gear and the lapping tool 200 is changed by rotating a chuck 16 (see FIG. 4) holding a gear (workpiece) or an index rotation unit (see FIG. 4) supporting a holder 8 holding the lapping unit 194 and the gear is worked in sequence, thereby machining all gear parts of the gear.

Figure 32:
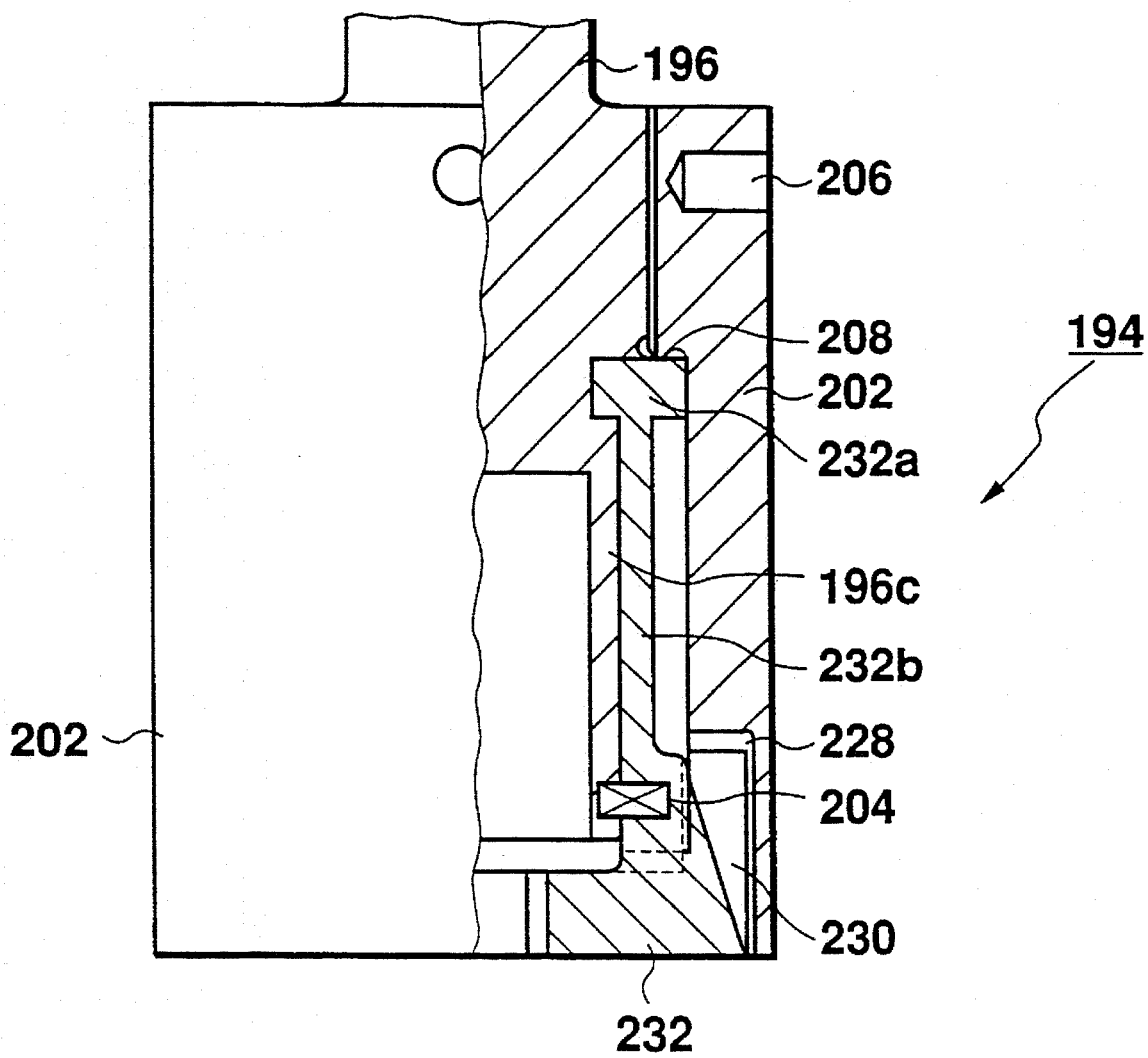
FIG. 32 is a partial sectional view of a lapping unit according to an eleventh embodiment of the present invention.

A lapping unit shown as an eleventh embodiment has a similar configuration to that in the tenth embodiment, as shown in FIG. 32. It is characterized by the fact that lapping tool 232 has a spring structure like a tea whisk and that the pin 198 as in FIG. 31(A) is not used. The lapping tool 232 has a plate spring 232a and is attached to a retainer 196c of a supporter 196 with a screw or the like. A rotating tool (not shown) is inserted into a rotating tool insertion hole 206 and a taper member 202 is rotated for upward movement. Since the lapping tool 232 has the spring structure like a tea whisk, the sections into which the lapping tool 232 is split can be opened in the external circumference direction. The lapping tool 232, whose top end has a sectional form like a letter T, projects outwardly beyond the external circumference of the supporter 196. Therefore, it also serves as a stopper when the taper member 202 falls. The plate spring 232a of the lapping tool 232 must be adapted to move with a lower load than a spring 204 energizing so as to open the lapping tool 232 outwardly.

Figure 33:
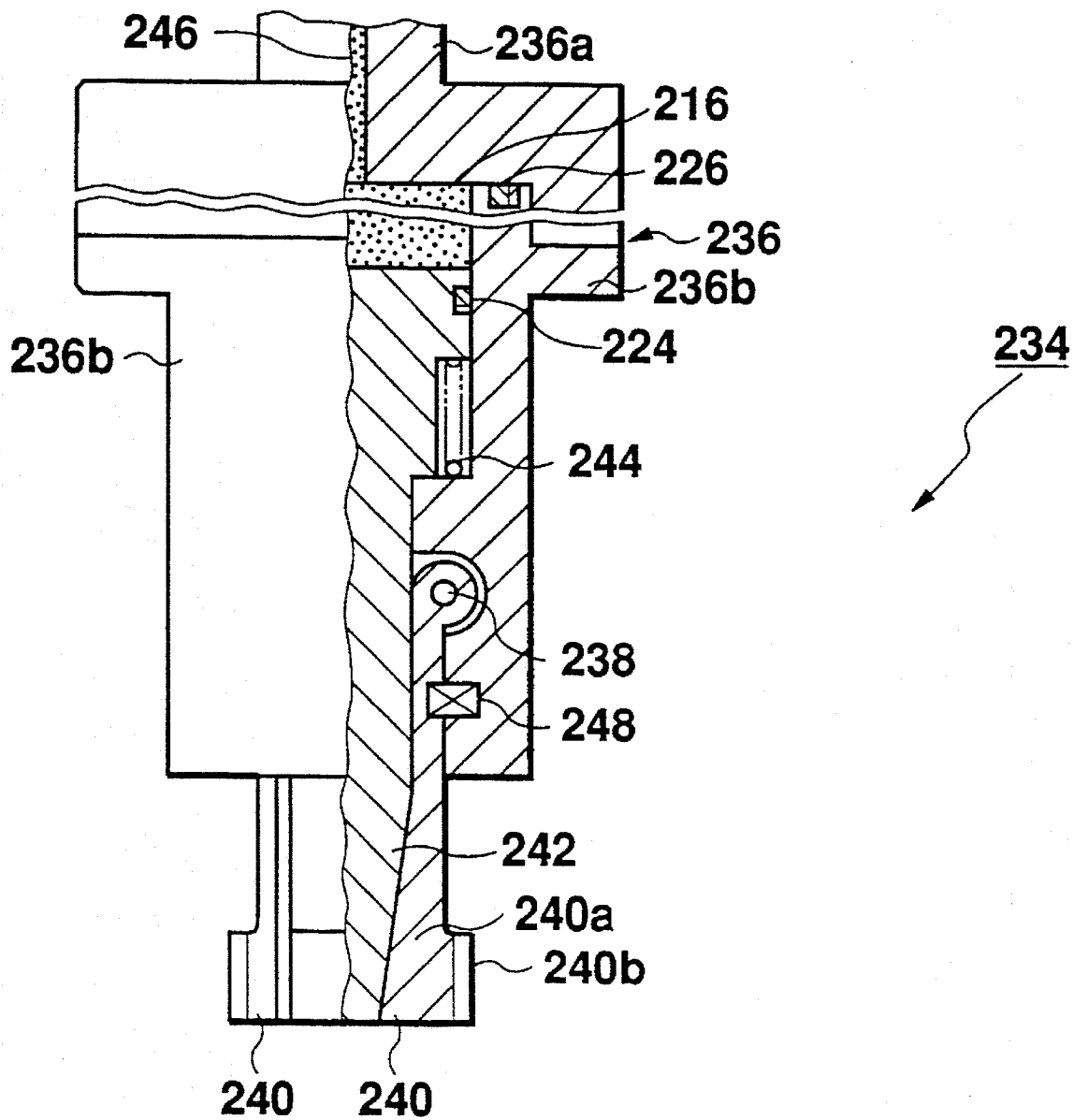
FIG. 33 is a partial sectional view of a lapping unit according to a twelfth embodiment of the present invention.

A lapping unit 234 shown in FIG. 33 as a twelfth embodiment is used for internal gears while the lapping unit 194 described above is used for external gears.

That is, the lapping unit 234 is provided by configuring the lapping unit 194 shown in FIG. 29 for internal gears. As shown in FIG. 33, a lapping tool 240 is pivotally fixed via a pin 238 to a supporter 236 consisting of a supporter base 236a and a supporter main unit 236b. A taper member 242 is installed on the internal circumference of the lapping tool 240.

The lapping tool 240 is split into four sections at predetermined intervals as in the tenth embodiment shown in FIG. 31(A) and has a taper face on the internal circumference; each section of the lapping tool 240 has an outwardly projected part 240a. A lapping grindstone 240b is installed on the tip of the projected part 240a. The taper member 242 has a taper face along the taper face of the lapping tool 240 and is energized upward by a spring 244 located between the taper member 242 and the supporter main unit 236b. The position (height) of the taper member 242 is adjusted by adjusting the supply amount of a supply member 216 such as oil or air supplied through a passage 246 formed in the supporter base 236a. When the taper member 242 fails, the lapping tool 240 opens outwardly. When the taper member 242 rises, the lapping tool 240 is closed inwardly by the energy of a spring 248 as an elastic member located between the lapping tool 240 and the supporter main unit 236*b*.

How the lapping unit 234 thus configured for internal gears is operated will be described. For example, to machine a gear where the inner diameter of the entrance is smaller than that of a gear at the depth as shown in FIG. 26(B), 26(C), the taper member 242 is slid upward to close the lapping tool 240. The lapping unit 234 held by the holder 8 is moved downward to a predetermined position by a Z direction feed mechanism driven by the head section driving servo motor 40 shown in FIG. 4. Then, while the phase of the lapping tool 240 is matched with that of the gear. The entire lapping unit 234 is slid up and down by the Z direction feed mechanism and the lapping tool 240 is opened gradually for lapping. The lapping tool 240 is replaced with another lapping tool for lapping the gear positioned at the top of FIG. 26(B).

Figure 34A:
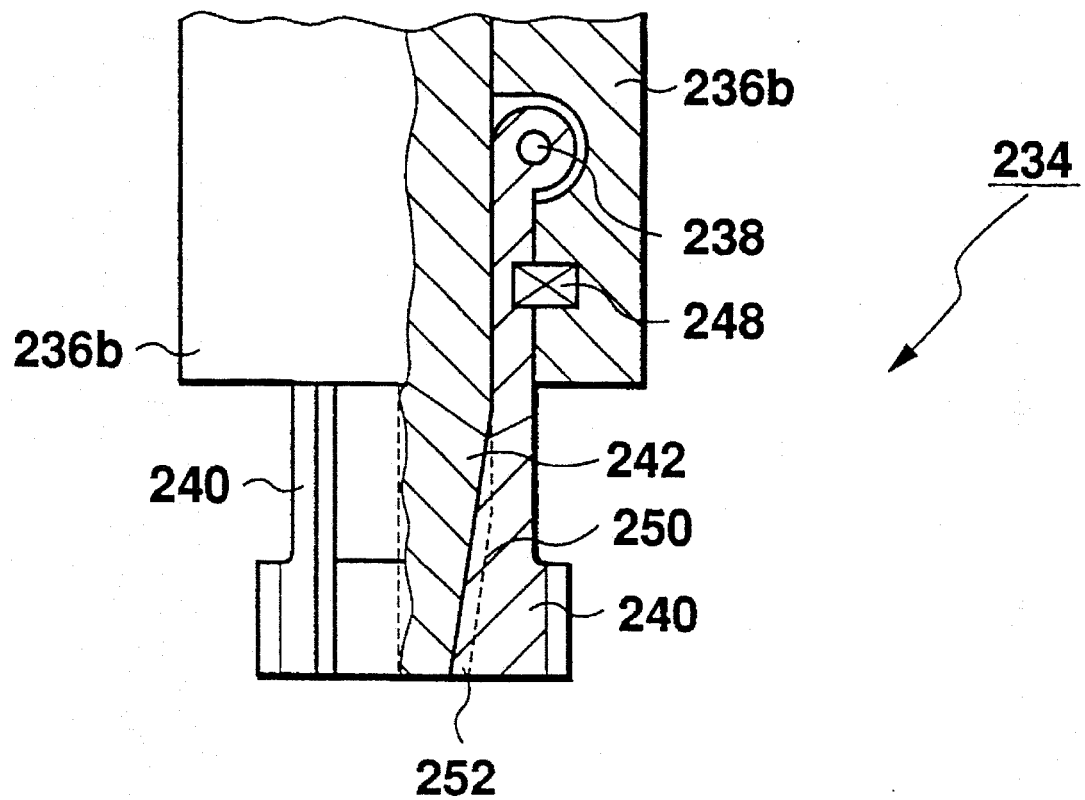
FIG. 34(A) is a partial sectional view of a lapping unit according to a thirteenth embodiment of the present invention.
Figure 34B:
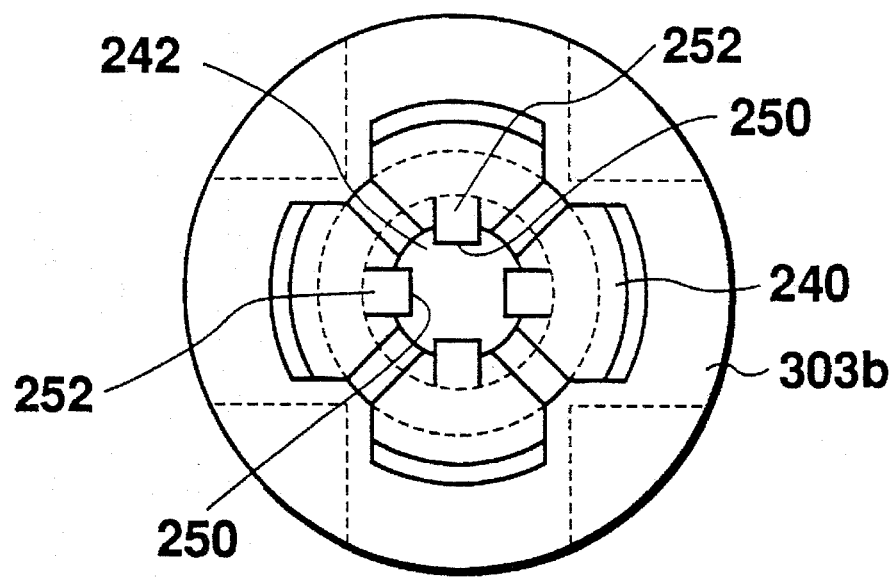
FIG. 34(B) is an end view of the lapping unit according to the thirteenth embodiment of the present invention.

A lapping unit 234 as thirteenth embodiment shown in FIG. 34(A) has substantially the same configuration as in the twelfth embodiment except that, as seen from FIG. 34(B) which is a bottom view of the lapping unit 234, a taper member 242 is formed with groove parts 250 and a lapping tool 240 is formed with convex guides 252 for providing stability when the lapping tool is opened or closed.

What is claimed is:

1. An apparatus for machining a gear shape comprising:
   a chuck for pivotally supporting a workpiece;
   a mechanism for rotating said chuck;
   a mechanism for moving said chuck in any desired direction on a plane;
   a holder pivotally supporting a form tool of a gear shape used to machine said workpiece;
   a mechanism for rotating said holder;
   a mechanism for sliding said holder in a direction vertical to a chuck move plane; and
   a control section which controls said chuck rotation mechanism, said chuck move mechanism, said holder rotation mechanism, and said holder sliding mechanism for causing said form tool to approach a mesh assumed position with said workpiece, rotating said workpiece and said form tool synchronously, and applying cut amount control between both axes of said workpiece and said form tool, thereby machining said workpiece with said form tool.

2. The apparatus as claimed in claim 1 wherein said form tool is an electrode for electric discharge machining whereby said workpiece is electric-discharge-machined to provide a desired gear shape.

3. The apparatus as claimed in claim 1 wherein said form tool is a grinding wheel for grinding whereby said workpiece is ground to provide a desired gear shape.

4. The apparatus as claimed in claim 3 wherein said control section controls so that said workpiece and said grinding wheel are relatively reciprocate in a tooth trace direction of the gear shape for grinding said workpiece with said grinding wheel to provide a desired gear shape.

5. The apparatus as claimed in claim 1 wherein said form tool is a lapping grindstone whereby said workpiece is lapped to provide a desired gear shape.

6. The apparatus as claimed in claim 5 wherein said control section controls so that said workpiece and said lapping grindstone relatively reciprocate in a tooth trace direction of the gear shape for lapping said workpiece with said lapping grindstone to provide a desired gear shape.

7. The apparatus as claimed in claim 5 wherein said control section controls so that said lapping grindstone is vibrated at high frequency in a tooth trace direction of the gear shape for lapping said workpiece with said lapping grindstone to provide a desired gear shape.

8. The apparatus as claimed in claim 6 wherein said control section controls so that said lapping grindstone is reciprocated and is vibrated at high frequency in a tooth trace direction of the gear shape for lapping said workpiece with said lapping grindstone to provide a desired gear shape.

9. An apparatus for machining a gear shape comprising:
   a chuck for pivotally supporting a workpiece;
   a mechanism for moving said chuck in any desired direction on a plane;
   a unit for lapping said workpiece;
   a holder for pivotally supporting said lapping unit;
   a mechanism for sliding said holder in a direction vertical to a chuck move plane; and
   a control section which controls said chuck movement mechanism and said holder sliding mechanism for moving up and down said lapping unit against said workpiece, thereby lapping said workpiece,
   said lapping unit having:
   a supporter substantially like a pillar; and
   a lapping tool being attached to an axle center of said supporter in a way in which said lapping tool can be opened and closed and having a projection having a lapping grindstone.

10. The apparatus as claimed in claim 9 wherein said lapping tool includes:
    an elastic member being disposed between said supporter and said lapping tool for energizing said lapping tool in an open direction; and
    a regulation member being located on an external circumference of said supporter slidably in an axial direction of said supporter, an internal circumference of said regulation member being formed like a taper, for regulating open and closing operation of said lapping tool.

11. The apparatus as claimed in claim 9 wherein said lapping tool includes:
    an elastic member being disposed between said supporter and said lapping tool for energizing said lapping tool in a closing direction; and
    a regulation member being located on an external circumference of said supporter slidably in an axial direction of said supporter, an internal circumference of said regulation member being formed like a taper, for regulating open and closing operation of said lapping tool.

12. An apparatus for measuring a gear shape comprising:
    a chuck for pivotally supporting a workpiece;
    a mechanism for rotating said chuck;
    a mechanism for moving said chuck in any desired direction on a horizontal plane;
    a form master gear having a displacement section which performs displacement in response to a shape of said workpiece;
    a holder for pivotally supporting said form master gear;
    a control section which controls said chuck rotation mechanism and said chuck movement mechanism for causing said workpiece and said form master gear to be meshed together and causing said form master gear to follow rotation of said workpiece; and
    an error detection section which detects displacement of the displacement section of said form master gear for detecting a shape error of said workpiece.

13. The apparatus as claimed in claim 12 wherein said error detection section detects displacement in a diameter direction of said form master gear and said workpiece with respect to an ideal mesh path.

14. The apparatus as claimed in claim 12 wherein said error detection section detects displacement in a rotation direction of said form master gear and said workpiece with respect to an ideal mesh path.

15. The apparatus as claimed in claim 12 further including a mechanism for sliding said holder in a vertical direction to a chuck move plane, wherein said form master gear is made thin in a tooth trace direction thereof; and said control section controls said chuck rotation mechanism, said chuck move mechanism, and said holder slide mechanism for causing said workpiece and said form master gear to be meshed together, causing said form master gear to follow rotation of said workpiece, and causing said form master gear to move in a tooth trace direction of said workpiece.

16. An apparatus for measuring a gear shape comprising:

a chuck for pivotally supporting a workpiece;

a mechanism for rotating said chuck;

a mechanism for moving said chuck in any desired direction on a plane;

a form master gear having a displacement section which performs displacement in response to a shape of said workpiece;

a holder for pivotally supporting said form master gear;

a mechanism for rotating said holder;

a control section which controls said chuck rotation mechanism, said chuck movement mechanism, and said holder rotation mechanism for causing said workpiece and said form master gear to be meshed together on an ideal mesh path and to be separately rotated for relative motion of said form master gear and said workpiece; and an error detection section which detects displacement of said form master gear and said workpiece with respect to said ideal mesh path for measuring a shape error of said workpiece and said form master gear.

17. The apparatus as claimed in claim 16 wherein said error detection section detects displacement in a diameter direction of said form master gear and said workpiece with respect to said ideal mesh path.

18. The apparatus as claimed in claim 16 wherein said error detection section detects displacement in a rotation direction of said form master gear and said workpiece with respect to said ideal mesh path.

19. The apparatus as claimed in claim 16 further including a mechanism for sliding said holder in a vertical direction to a chuck move plane, wherein said form master gear is made thin in a tooth trace direction thereof; and said control section controls said chuck rotation mechanism, said chuck movement mechanism, said holder rotation mechanism, and said holder slide mechanism for causing said workpiece and said form master gear to be meshed together on an ideal mesh path and to be separately rotated and causing said form master gear to move in a tooth trace direction of said workpiece.

20. A apparatus for machining a gear shape comprising:

a chuck for pivotally supporting a workpiece;

a mechanism for rotating said chuck;

a mechanism for moving said chuck in any desired direction on a plane;

a holder holding a form tool, said holder being disposed movably to any desired position and able to be rotated;

a mechanism for rotating said holder;

a first eccentric ring, with an axle center of an internal circumference of said ring being eccentric to that of an external circumference of said ring, for holding said holder on said internal circumference;

at least one contour eccentric ring disposed for holding said first eccentric ring on an internal circumference of said contour eccentric ring;

a mechanism for sliding said holder in a direction vertical to a chuck move plane; and a control section which controls said chuck rotation mechanism, said chuck movement mechanism, said holder rotation mechanism, and said holder sliding mechanism, and controls rotation amounts of said first eccentric ring and said contour eccentric ring for causing said form tool to approach a mesh assumed position with said workpiece, rotating said workpiece and said form tool synchronously, and applying cut amount control between both axes of said workpiece and said form tool, thereby machining said workpiece with said form tool.

21. The apparatus as claimed in claim 20 wherein said form tool is an electrode for electric discharge machining whereby said workpiece is electric-discharge-machined to provide a desired gear shape.

22. The apparatus as claimed in claim 20 wherein said form tool is a grinding wheel for grinding whereby said workpiece is ground to provide a desired gear shape.

23. The apparatus as claimed in claim 22 wherein said control section controls so that said workpiece and said grinding wheel relatively reciprocate in a tooth trace direction of the gear shape for grinding said workpiece with said grinding wheel to provide a desired gear shape.

24. The apparatus as claimed in claim 20 wherein said form tool is a lapping grindstone whereby said workpiece is lapped to provide a desired gear shape.

25. The apparatus as claimed in claim 24 wherein said control section controls so that said workpiece and said lapping grindstone relatively reciprocate in a tooth trace direction of the gear shape for lapping said workpiece with said lapping grindstone to provide a desired gear shape.

26. The apparatus as claimed in claim 24 wherein said control section controls so that said lapping grindstone is vibrated at high frequency in a tooth trace direction of the gear shape for lapping said workpiece with said lapping grindstone to provide a desired gear shape.

27. The apparatus as claimed in claim 25 wherein said control section controls so that said lapping grindstone is reciprocated and is vibrated at high frequency in a tooth trace direction of the gear shape for lapping said workpiece with said lapping grindstone to provide a desired gear shape.

28. An apparatus for measuring a gear shape comprising:

a chuck for pivotally supporting a workpiece;

a mechanism for rotating said chuck;

a mechanism for moving said chuck in any desired direction on a horizontal plane;

a form master gear having a displacement section which performs displacement in response to a shape of said workpiece;

a rotatable holder for holding said form master gear and being disposed movably to any desired position;

a first eccentric ring, with an axle center of an internal circumference of said ring being eccentric to that of an external circumference of said ring, for holding said holder on said internal circumference;

at least one contour eccentric ring disposed for holding said first eccentric ring on an internal circumference of said contour eccentric ring;

a control section which controls said chuck rotation mechanism and said chuck movement mechanism and controls rotation amounts of said first eccentric ring and said contour eccentric ring for causing said workpiece and said form master gear to be meshed together and causing said form master gear to follow rotation of said workpiece; and an error detection section which detects displacement of the displacement section of said form master gear for detecting a shape error of said workpiece.

29. The apparatus as claimed in claim 28 wherein said error detection section detects displacement in a diameter direction of said form master gear and said workpiece with respect to said ideal mesh path.

30. The apparatus as claimed in claim 28 wherein said error detection section detects displacement in a rotation direction of said form master gear and said workpiece with respect to said ideal mesh path.

31. The apparatus as claimed in claim 28 further including a mechanism for sliding said holder in a vertical direction to a chuck move plane, wherein said form master gear is made thin in a tooth trace direction thereof; and said control section controls said chuck rotation mechanism, said chuck movement mechanism, and said holder slide mechanism and controls rotation amounts of said first eccentric ring and said contour eccentric ring for causing said workpiece and said form master gear to be meshed together, causing said form master gear to follow rotation of said workpiece, and causing said form master gear to move in a tooth trace direction of said workpiece.

32. An apparatus for measuring a gear shape comprising:

a chuck for pivotally supporting a workpiece;

a mechanism for rotating said chuck;

a mechanism for moving said chuck in any desired direction on a plane;

a form master gear having a displacement section which performs displacement in response to a shape of said workpiece;

a rotatable holder for holding said form master gear and being disposed movably to any desired position;

a mechanism for rotating said holder;

a first eccentric ring, with an axle center of an internal circumference of said ring being eccentric to that of an external circumference of said ring, for holding said holder on said internal circumference;

at least one contour eccentric ring disposed for holding said first eccentric ring on an internal circumference of said contour eccentric ring;

a control section which controls said chuck rotation mechanism, said chuck movement mechanism, and said holder rotation mechanism and controls rotation amounts of said first eccentric ring and said contour eccentric ring for causing said workpiece and said form master gear to be meshed together on an ideal mesh path and to be separately rotated for relative motion of said form master gear and said workpiece; and an error detection section which detects displacement of said form master gear and said workpiece with respect to said ideal mesh path for measuring a shape error of said workpiece and said form master gear.

33. The apparatus as claimed in claim 32 wherein said error detection section detects displacement in a diameter direction of said form master gear and said workpiece with respect to said ideal mesh path.

34. The apparatus as claimed in claim 32 wherein said error detection section detects displacement in a rotation direction of said form master gear and said workpiece with respect to said ideal mesh path.

35. The apparatus as claimed in claim 32 further including a mechanism for sliding said holder in a vertical direction to a chuck move plane, wherein said form master gear is made thin in a tooth trace direction thereof; and said control section controls said chuck rotation mechanism, said chuck movement mechanism, said holder rotation mechanism, and said holder slide mechanism and controls rotation amounts of said first eccentric ring and said contour eccentric ring for causing said workpiece and said form master gear to be meshed together on an ideal mesh path for rotation and causing said form master gear to move in a tooth trace direction of said workpiece.

36. A method of machining a gear shape comprising the steps of causing a form tool of a gear shape to approach a workpiece pivotally supported by a chuck, rotating said workpiece and said form tool synchronously at a mesh assumed position, applying cut amount control between both axes of said workpiece and said form tool, and machining said workpiece with said form tool to provide a desired gear shape.

37. The method as claimed in claim 36 wherein said form tool is an electrode for electric discharge machining whereby said workpiece is electric-discharge-machined to provide the desired gear shape.

38. The method as claimed in claim 36 wherein said form tool is a grinding wheel for grinding whereby said workpiece is ground to provide the desired gear shape.

39. The method as claimed in claim 38 wherein said workpiece and said grinding wheel are relatively reciprocated in a tooth trace direction of the gear shape for grinding said workpiece with said grinding wheel to provide the desired gear shape.

40. The method as claimed in claim 36 wherein said form tool is a lapping grindstone whereby said workpiece is lapped to provide the desired gear, shape.

41. The method as claimed in claim 40 wherein said workpiece and said lapping grindstone are relatively reciprocated in a tooth trace direction of the gear shape for lapping said workpiece with said lapping grindstone to provide the desired gear shape.

42. The method as claimed in claim 40 wherein said lapping grindstone is vibrated at high frequency in a tooth trace direction of the gear shape for lapping said workpiece with said lapping grindstone to provide the desired gear shape.

43. The method as claimed in claim 41 wherein said lapping grindstone is reciprocated and is vibrated at high frequency in a tooth trace direction of the gear shape for lapping said workpiece with said lapping grindstone to provide the desired gear shape.

44. The method as claimed in claim 36 wherein said form tool is a form master gear for measuring the gear shape and wherein when said workpierce pivotally supported and said form master gear pivotally supported are meshed together and moved on an ideal mesh path, displacement of said form master gear and said workpiece with respect to said ideal mesh path is detected for measuring a shape error of said workpiece.

45. The method as claimed in claim 44 wherein when said form master gear is rotated following said workpiece which is rotated, displacement of said form master gear and said workpiece with respect to said ideal mesh path is detected for measuring a shape error of said workpiece.

46. The method as claimed in claim 45 wherein the displacement of said form master gear and said workpiece with respect to said ideal mesh path is displacement in a diameter direction of said workpiece of gear shape.

47. The method as claimed in claim 45 wherein the displacement of said form master gear and said workpiece with respect to said ideal mesh path is displacement in a rotation direction of said workpiece of gear shape.

48. The method as claimed in claim 45 wherein when said workpiece and said form master gear which is thin in a tooth trace direction are meshed together and moved on an ideal mesh path and said form master gear is moved in a tooth trace direction of said workpiece, displacement of said form master gear and said workpiece with respect to said ideal mesh path is detected for measuring a shape error of said workpiece and said form master gear.

49. The method as claimed in claim 44 wherein said workpiece and said form master gear are meshed together on an ideal mesh path and rotated separately and displacement of said form master gear and said workpiece with respect to said ideal mesh path is detected for measuring a shape error of said workpiece and said form master gear.

50. The method as claimed in claim 49 wherein the displacement of said form master gear and said workpiece with respect to said ideal mesh path is displacement in a diameter direction of said workpiece of gear shape.

51. The method as claimed in claim 49 wherein the displacement of said form master gear and said workpiece with respect to said ideal mesh path is displacement in a rotation direction of said workpiece of gear shape.

52. The method as claimed in claim 49 wherein when said workpiece and said form master gear which is thin in a tooth trace direction are meshed together and moved on an ideal mesh path and said form master gear is moved in a tooth trace direction of said workpiece, displacement of said form master gear and said workpiece with respect to said ideal mesh path is detected for measuring a shape error of said workpiece and said form master gear.

53. The method as claimed in claim 36 wherein with said workpiece chucked, electric discharge machining, grinding, lapping, and shape measurement of said workpiece are performed consecutively.

54. A method of machining a gear shape comprising the steps of causing a form tool and a workpiece held by a chuck to approach each other, rotating said workpiece and said form tool synchronously at a mesh assumed position, applying cut amount control between both axes of said workpiece and said form tool, and machining said workpiece with said form tool to provide a desired gear shape, wherein a holder for holding said form tool and being movable to any desired position is held on an internal circumference of a first eccentric ring with an axle center of the internal circumference being eccentric to that of an external circumference of said ring and rotation amounts of said first eccentric ring and of at least one contour eccentric ring for holding said first eccentric ring on an internal circumference of said contour eccentric ring are separately controlled, thereby moving said holder along any desired movement path and determining a machined shape of said workpiece by a shape of said form tool and the movement path of said holder.

55. The method as claimed in claim 54 wherein said form tool is an electrode for electric discharge machining whereby said workpiece is electric-discharge-machined to provide the desired gear shape.

56. The method as claimed in claim 54 wherein said form tool is a grinding wheel for grinding whereby said workpiece is ground to provide the desired gear shape.

57. The method as claimed in claim 54 wherein said form tool is a lapping grindstone whereby said workpiece is lapped to provide the desired gear shape.

58. The method as claimed in claim 54 wherein said form tool is a form master gear for measuring the gear shape and wherein when said workpiece pivotally supported and said form master gear pivotally supported are meshed together and moved on an ideal mesh path, displacement of said form master gear and said workpiece with respect to said ideal mesh path is detected for measuring a shape error of said workpiece.

59. The method as claimed in claim 54 wherein with said workpiece chucked, electric discharge machining, grinding, lapping, and shape measurement of said workpiece are performed consecutively.

* * * * *